United States Patent
Forbes et al.

(10) Patent No.: US 8,924,735 B2
(45) Date of Patent: Dec. 30, 2014

(54) MANAGED BIOMETRIC IDENTITY

(71) Applicant: Microsoft Corporation, Redmond, WA (US)

(72) Inventors: Ronald Forbes, Seattle, WA (US);
Bhaven Dedhia, Redmond, WA (US);
Tim Keosabablan, Redmond, WA (US);
Tommer Leyvand, Seattle, WA (US);
Jinyu Li, Sammamish, WA (US);
Timothy Gerken, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/768,144

(22) Filed: Feb. 15, 2013

(65) Prior Publication Data
US 2014/0237587 A1  Aug. 21, 2014

(51) Int. Cl.
*H04L 9/32* (2006.01)
*G06F 21/00* (2013.01)
*H04L 29/14* (2006.01)

(52) U.S. Cl.
CPC ..................................... *G06F 21/00* (2013.01)
USPC ............................... 713/186; 726/28; 726/29

(58) Field of Classification Search
CPC . G06F 21/32; G06F 21/31; G06F 2203/0338; G07F 17/3239; H04L 63/102; H04L 63/0861; H04L 9/32; H04L 9/3231; H04L 9/3273; A61B 5/1077; H04N 21/4223; H04N 21/4415; H04N 21/4532
See application file for complete search history.

(56) References Cited

U.S. PATENT DOCUMENTS

| | | | |
|---|---|---|---|
| 5,930,804 A * | 7/1999 | Yu et al. | 1/1 |
| 6,920,236 B2 | 7/2005 | Prokoski | |
| 6,944,319 B1 | 9/2005 | Huang et al. | |
| 7,864,987 B2 * | 1/2011 | Venkatanna et al. | 382/115 |
| 8,073,287 B1 | 12/2011 | Wechsler et al. | |
| 8,243,929 B2 | 8/2012 | Wells et al. | |
| 8,265,341 B2 | 9/2012 | Dernis et al. | |
| 8,334,842 B2 | 12/2012 | Markovic et al. | |
| 2005/0055582 A1 | 3/2005 | Bazakos et al. | |
| 2011/0221670 A1 | 9/2011 | King et al. | |
| 2012/0169887 A1 | 7/2012 | Zhu et al. | |
| 2012/0257797 A1 | 10/2012 | Leyvand et al. | |

OTHER PUBLICATIONS

"Access Control and Personalization for Consumer Electronics", Retrieved on: Oct. 18, 2012, Available at: http://www.bionym.com/tech/heartid/#n.

(Continued)

*Primary Examiner* — Venkat Perungavoor
(74) *Attorney, Agent, or Firm* — Aaron Chatterjee; Kate Drakos; Micky Minhas

(57) ABSTRACT

A computing system such as a game console maintains and updates a biometric profile of a user. In one aspect, biometric data of the user is continuously obtained from a sensor such as an infrared and visible light camera, and used to update the biometric profile using a machine learning process. In another aspect, a user is prompted to confirm his or her identify when multiple users are detected at the same time and/or when the user is detected with a confidence level which is below a threshold. A real-time image of the user being identified can be displayed on a user interface with user images associated with one or more accounts. In another aspect, the biometric profile is managed by a shell on the computing system, where the shell makes the biometric profile available to any of a number of applications on the computing system.

20 Claims, 17 Drawing Sheets

(56) References Cited

OTHER PUBLICATIONS

Nakajima, Chikahito, et al., "People Recognition in Image Sequences by Supervised Learning," Massachusetts Intstitute of Technology, Jun. 2000, 13 pages.

Gernoth, Thorsten, et al., "Camera Characterization for Face Recognition under Active Near-Infrared Illumination," Proceedings of SPIE, vol. 7529, Jan. 17, 2010, 10 pages.

Sklebar, Filip, et al., "Machine Learning Algorithms for Face Recognition," [http://www.s3.sci.hr/FaceRecognition%20webreport.pdf], Jan. 2011, 13 pages.

Leyvand, Tommer, et al, "Kinect Identity: Technology and Experience," IEEE Computer Society, Apr. 2011, 4 pages.

Bhowmik, Mrinal K., et al., "Thermal Infrared Face Recognition—a Biometric Identification Technique for Robust Security System," InTech, [www.intechopen.com], Jul. 27, 2011, 27 pages.

Hizem, Walid, et al., "Near Infrared Sensing and Associated Landmark Detection for Face Recognition," SPIE Proceedings, vol. 17, Jan. 1, 2008, 12 pages.

Wei, Yichen, et al., "Vision and graphics applications on Kinect," Microsoft Research Asia—Faculty Summit 2012, Nov. 2012, 29 pages.

International Search Report & The Written Opinion of the International Searching Authority dated Apr. 25, 2014, International Application No. PCT/US2014/016156.

Written Opinion of the International Preliminary Examining Authority dated Sep. 26, 2014, International Application No. PCT/US2014/016156.

\* cited by examiner

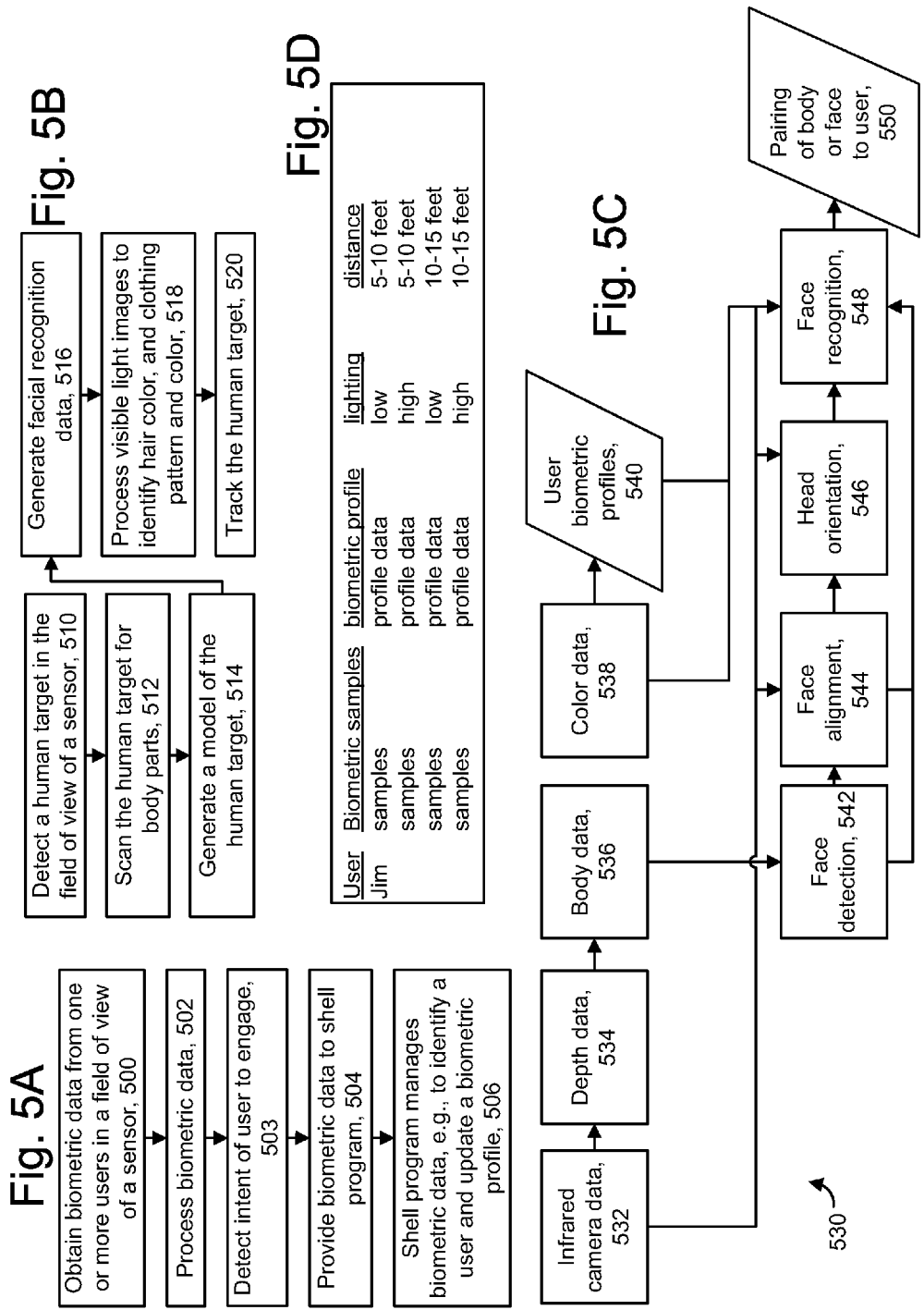

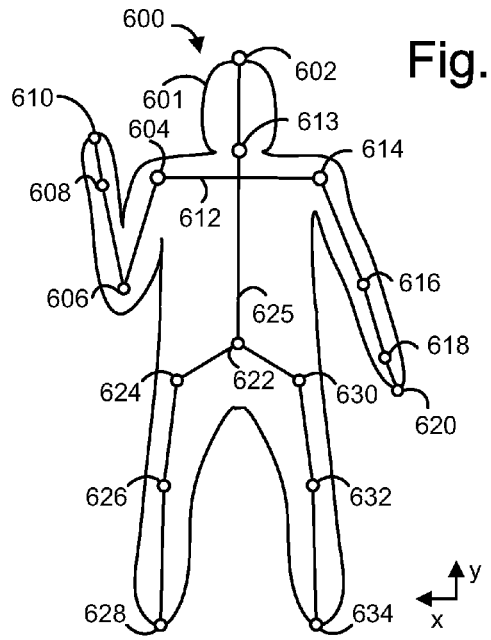
Fig. 6A
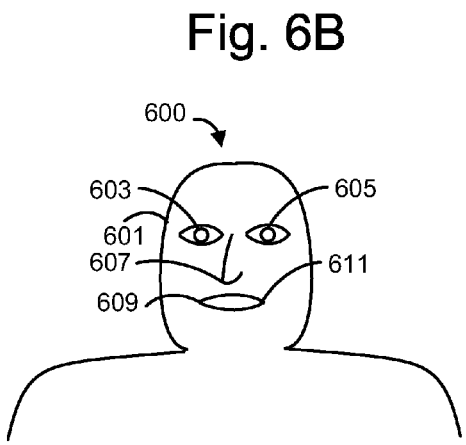
Fig. 6B
Fig. 6C
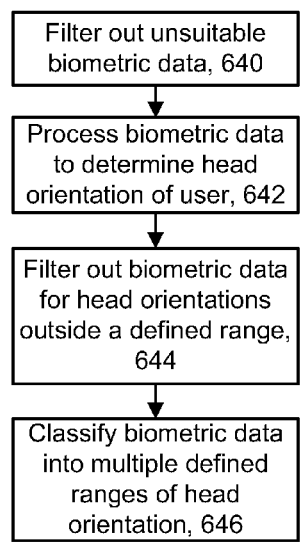
Fig. 6D
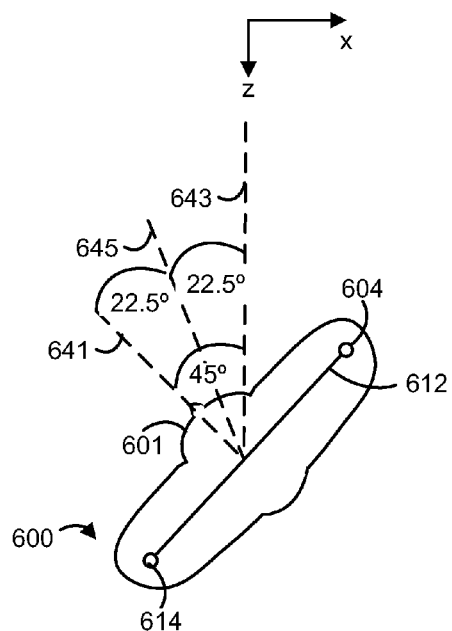

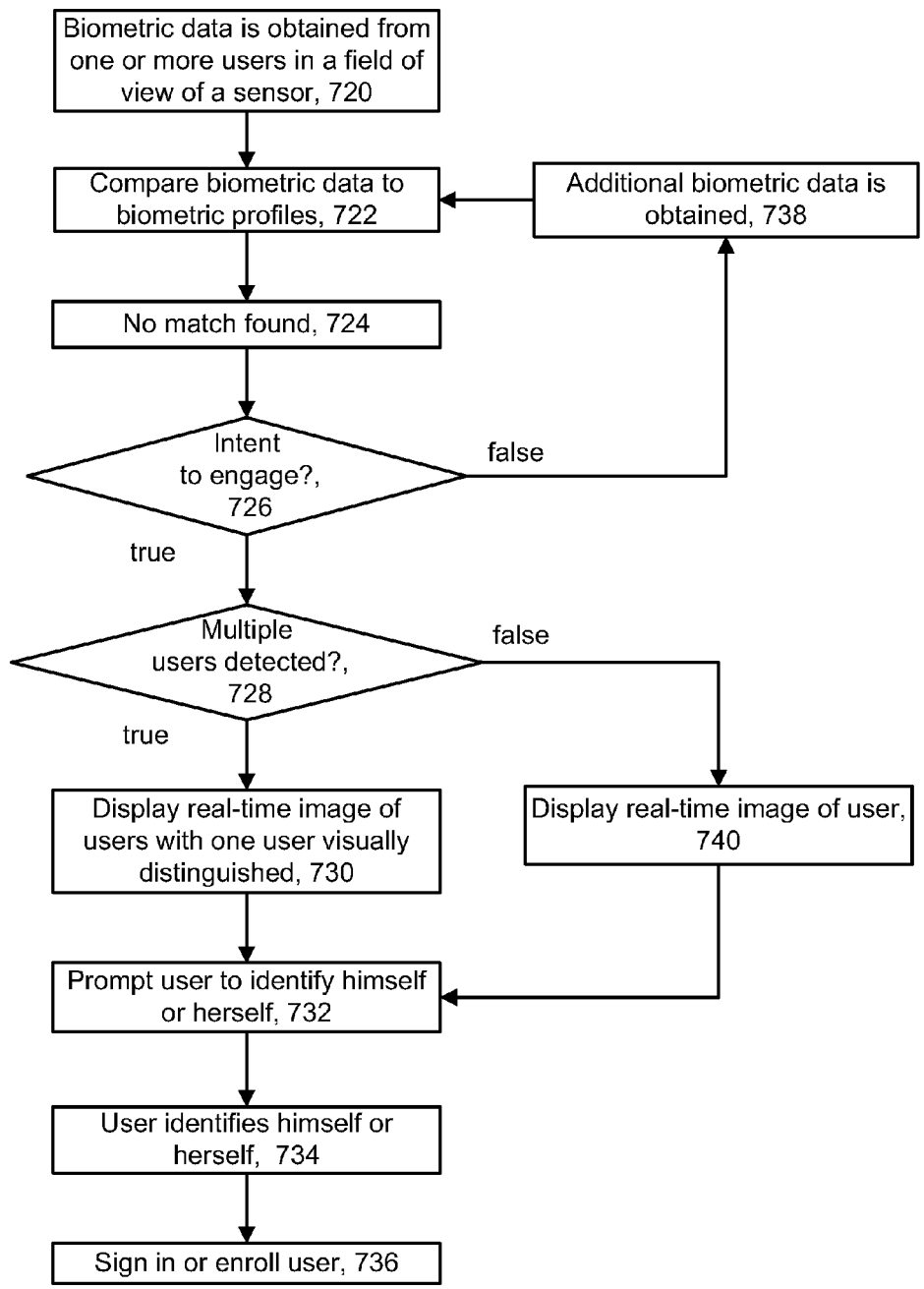

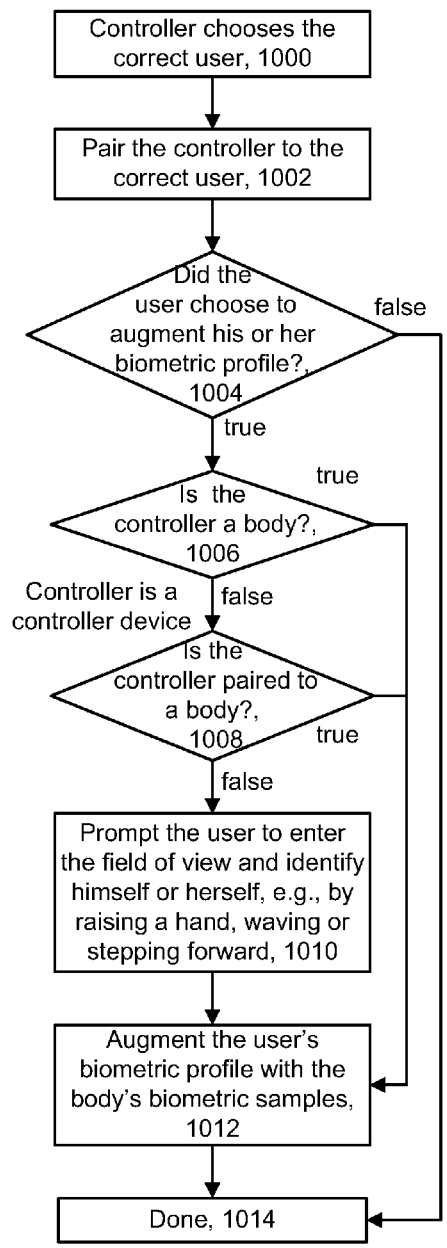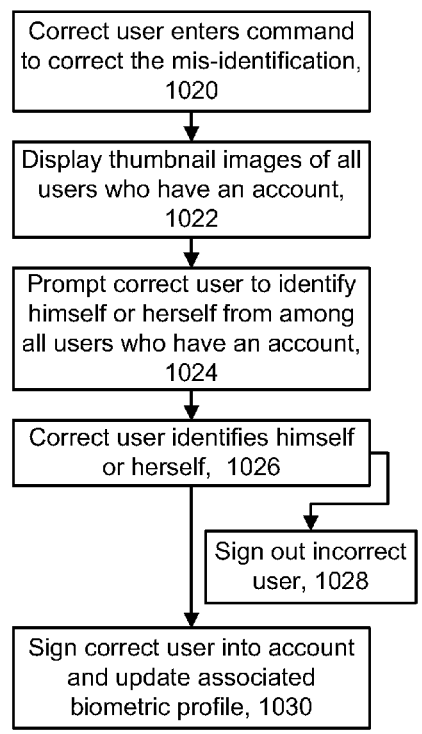

Fig. 12A

| Actual user | Controller | Identified user |
|---|---|---|
| Dad | body 1, gamepad A | Identifying |
| Ben | body 2 | Identifying |
| Mom | body 3 | Identifying |

Fig. 12B

| Actual user | Controller | Identified user |
|---|---|---|
| Dad | body 1, gamepad A | Dad |
| Ben | body 2 | Identifying |
| Mom | body 3 | Identifying |

Fig. 12C

| Actual user | Controller | Identified user |
|---|---|---|
| Dad | body 1, gamepad A | Dad |
| Ben | body 2 | Ben |
| Mom | body 3 | Identifying |

Fig. 12D

| Actual user | Controller | Identified user |
|---|---|---|
| Dad | | Dad |
| Ben | body 2 | Ben |
| Mom | body 3 | Identifying |

Fig. 12E

| Actual user | Controller | Identified user |
|---|---|---|
| Dad | | Dad |
| Dad | body 1 | Identifying |
| Ben | body 2 | Ben |
| Mom | body 3 | Identifying |

Fig. 12F

| Actual user | Controller | Identified user |
|---|---|---|
| Dad | body 1 | Dad |
| Ben | body 2 | Identifying |
| Mom | body 3 | Identifying |

Fig. 12G

| Actual user | Controller | Identified user |
|---|---|---|
| Dad | body 1 | Dad |
| Ben | body 2 | identifying |

Fig. 12H

| Actual user | Controller | Identified user |
|---|---|---|
| Dad | body 1 | Dad |
| ben | body 2 | Ben |

MANAGED BIOMETRIC IDENTITY

BACKGROUND

Biometric data can be used to recognize a person based on physical characteristics of the person. For example, a person can be identified based on a facial appearance, hair color, clothing, height, voice and so forth. The biometric data can be used to control access to a computing system and to configure the computing system based on preferences of the person. Typically, biometric data is obtained from the user in a setup process and stored as a template at the computing system. When the person subsequently desires to access the computing system, the template is used to identify the person.

SUMMARY

As described herein, techniques are provided for identifying a user of a computing system such as a game console using biometric data. Biometric data is continuously obtained and stored for one or multiple people within a field of view of a sensor. The computing system can immediately identify the person using biometric data and automatically sign them in to an account on the computing system. The biometric profile can be managed by a shell program on behalf of applications such as different games of the computing system.

In one approach, a computer-implemented method is provided for recognizing a user of a computing system. The method includes obtaining biometric data of a user from a sensor while the user is in a field of view of the sensor. For example, the sensor can be an active infrared and/or visible light camera. The method further includes signing the user into an account in the computing system, where the account associates the user with a biometric profile of the user, and the biometric profile comprises biometric data of the user obtained from the sensor. Additional biometric data of the user is obtained from the sensor while the user is signed into the account and while the user is in the field of view of the sensor, and the biometric profile is updated based on the additional biometric data. The user may be prompted to identify himself or herself such as when there are multiple people in the field of view or when a confidence level of an identification is below a threshold. An intent by the user to engage with the computing system may also be detected, such as based on a gesture or other movement by the user.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 5A depicts a method for using biometric data as an input in an interactive system.

FIG. 5B depicts an example method for processing biometric data as set forth in step 502 of FIG. 7.

FIG. 5C depicts an example data flow for processing biometric data in accordance with step 502 of FIG. 5A.

FIG. 5D provides an example of categories of biometric samples and profiles.

FIG. 6A depicts an example model of a human target as set forth in step 514 of FIG. 5B.

FIG. 6B depicts an example of facial recognition data as set forth in step 516 of FIG. 5B.

FIG. 6C depicts an example process for filtering biometric data based on head orientation to provide facial recognition data in accordance with step 516 of FIG. 5B.

FIG. 6D depicts an example head orientation in accordance with step 642 of FIG. 6C.

FIG. 7B depicts another example process for enrolling or signing in a user with a computing system, in accordance with step 506 of FIG. 5A.

FIG. 10A depicts an example process for correcting an incorrect biometric recognition of a user in accordance with step 506 of FIG. 5A.

FIG. 10B depicts another example process for correcting an incorrect biometric recognition of a user in accordance with step 506 of FIG. 5A.

FIGS. 12A to 12H depict example states of a biometric recognition system in accordance with the user interfaces of FIGS. 11A to 11N.

DETAILED DESCRIPTION

Figure 1:
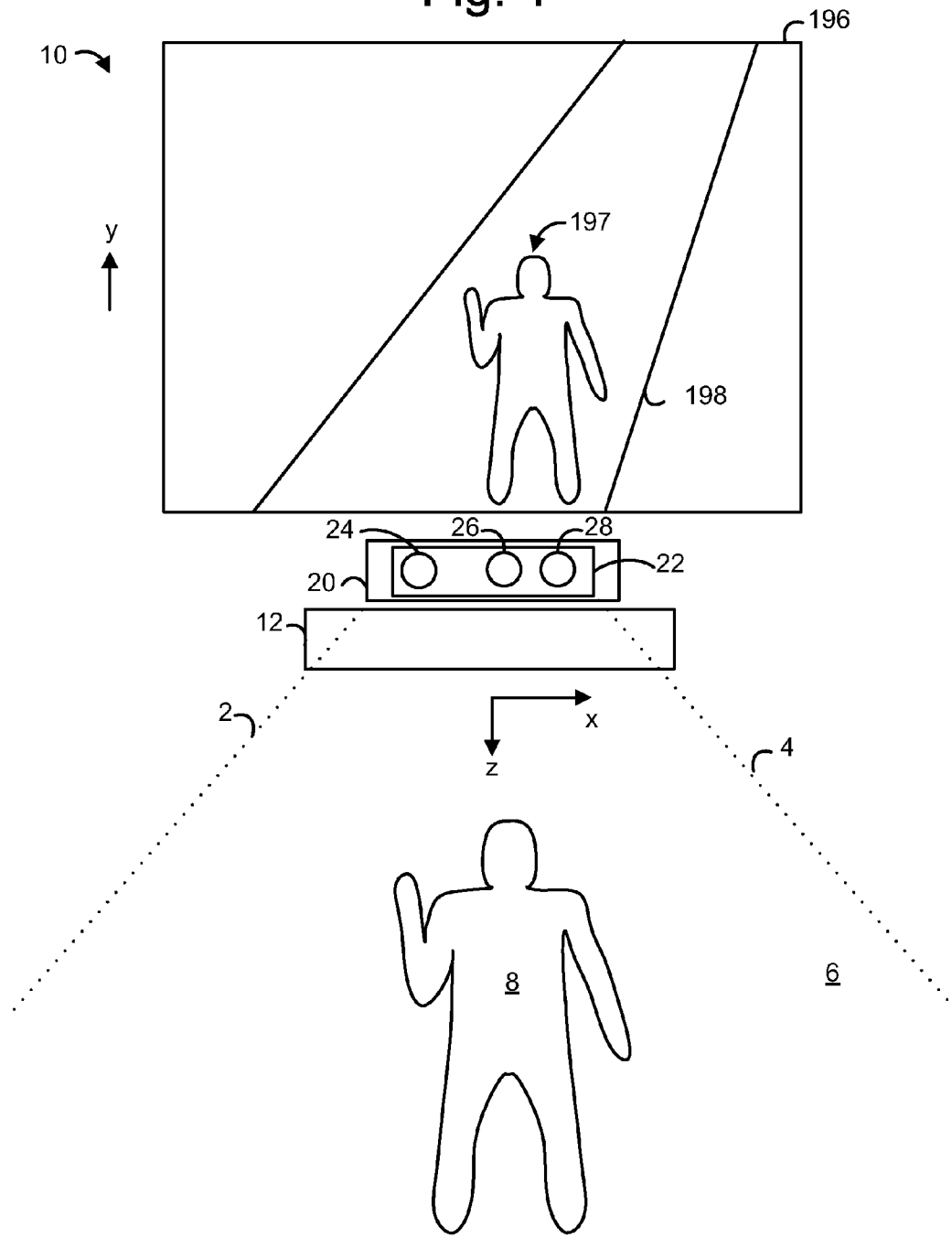
FIG. 1 depicts an example embodiment of an interactive system.

As mentioned at the outset, a computing system can use biometric data to recognize a person and to control access or configure the computing system based on preferences of the person. For example, a game console, PC, tablet or cell phone is a computing system which can provide access to various applications such as games as well as multimedia content from various networks. For instance, a game console typically allows a user to access content from local storage media such as an optical disk, from the Internet or from a television network.

The user of such a system interacts with the system such as to play a game, access video, music or other content, or communicate with others. To control access to the computing system and to keep track of information such as user preferences, game state and restrictions (e.g., age-based restriction on content), an account is established on behalf of each user of the computing system. The user signs in to the account to gain access to the applications. The user may interact with the computing system using a natural user interface (UI), such as an interface which uses a motion tracking camera to detect gestures and other movements of the user. Alternatively, or additionally, the user may interact with the computing system using a controller device such as a hand held controller, game pad or cell phone or by voice command.

It would be desirable for a user to have a persistent identity as he or she interacts with the computing system. One approach is to identify a user based on biometric characteristics such as facial appearance, hair color, clothing, height, voice and so forth. However, the use of biometric recognition to identify a user poses many challenges. For example, it can be difficult to recognize a user in realistic environment such as the user's living room or other room in the home in which computing systems are commonly set up, due to lighting conditions and other factors. Another challenge occurs if each application on the computing system separately manages a biometric recognition system, rather than the biometric recognition systems being an intrinsic component of the computing system itself. Finally, if a biometric recognition system is manually used on an as-needed basis, it does not gain any benefits of ubiquity such as offline processing or ahead-of-time recognition, leading users to perceive the systems as being slow and inaccurate. A biometric recognition system which addresses these challenges would be useful.

A biometric recognition system is provided which addresses these challenges and has many advantages. For example, the system can manage a biometric identity using a shell program and platform of a computing system, thereby relieving the individual applications of the computing system from performing this task. Without this approach, each application would use a separate user interface to manually identify users and manage their biometric identities.

The biometric recognition can use an active infrared sensor which provides dramatically improved lighting robustness, and head orientation to filter samples being compared to reference images. Moreover, the biometric recognition process can be always running. When a body begins to be tracked by the skeletal tracking system, the biometric identity system begins identifying the user. If the body is recognized as a user who was previously enrolled on the system, the body is paired to the user in the system's identity state. If the body is not recognized as a user, the shell allows the user to be biometrically enrolled as part of a standard sign-in/sign-up process.

In cases where the system incorrectly recognizes a body as an enrolled user (or doesn't recognize a body as the correct enrolled user), the shell allows for users to correct their identity through a system user interface (UI).

FIG. 1 depicts an example embodiment of an interactive system 10 in which a human 8 interacts with an application, such as in the home of a user. The interactive system 10 includes a display 196, a depth camera system 20, and a computing system 12. The depth camera system 20 may be a separate computing system or part of the computing system 12. The depth camera system 20 may include an image camera component 22 having an illuminator 24, such as an active infrared (IR) light emitter, an image sensor 26, such as an infrared camera, and a red-green-blue (RGB) visible light camera 28. A human 8, also referred to as a user, person or player, stands in a field of view 6 of the depth camera. Lines 2 and 4 denote a boundary of the field of view 6. In this example, the depth camera system 20, and computing system 12 provide an application in which an avatar 197 on the display 196 track the movements of the human 8. For example, the avatar may raise an arm when the human raises an arm. The avatar 197 is standing on a road 198 in a 3-D virtual world. A Cartesian world coordinate system may be defined which includes a z-axis which extends along the focal length of the depth camera system 20, e.g., horizontally, a y-axis which extends vertically, and an x-axis which extends laterally and horizontally. The perspective of the drawing is modified as a simplification, as the display 196 extends vertically in the y-axis direction and the z-axis extends out from the depth camera system, perpendicular to the y-axis and the x-axis, and parallel to a ground surface on which the user 8 stands.

Generally, the interactive system 10 is used to recognize, analyze, and/or track one or more human targets. The computing system 12 can include a computer, a gaming system or console, or the like, as well as hardware components and/or software components to execute applications.

The depth camera system 20 may include a camera which is used to visually monitor one or more people, such as the human 8, such that gestures and/or movements performed by the human may be captured, analyzed, and tracked to perform one or more controls or actions within an application, such as animating an avatar or on-screen character or selecting a menu item in a user interface (UI).

The interactive system 10 may be connected to an audio-visual device such as the display 196, e.g., a television, a monitor or the like, or even a projection on a wall or other surface that provides a visual and audio output to the user. An audio output can also be provided via a separate device. To drive the display, the computing system 12 may include a video adapter such as a graphics card and/or an audio adapter such as a sound card that provides audiovisual signals associated with an application.

The human 8 may be tracked using the depth camera system 20 such that the gestures and/or movements of the user are captured and used to animate an avatar or on-screen character and/or interpreted as input controls to the application being executed by computer environment 12.

Some movements of the human 8 may be interpreted as controls that may correspond to actions other than controlling an avatar. For example, in one embodiment, the player may use movements to end, pause, or save a game, select a level, view high scores, communicate with a friend, and so forth. The player may use movements to select the game or other application from a main user interface, or to otherwise navigate a menu of options. Thus, a full range of motion of the human 8 may be available, used, and analyzed in any suitable manner to interact with an application.

The interactive system 10 may further be used to interpret target movements as operating system and/or application controls that are outside the realm of games and other applications which are meant for entertainment and leisure. For example, virtually any controllable aspect of an operating system and/or application may be controlled by movements of the human 8.

Figure 2:
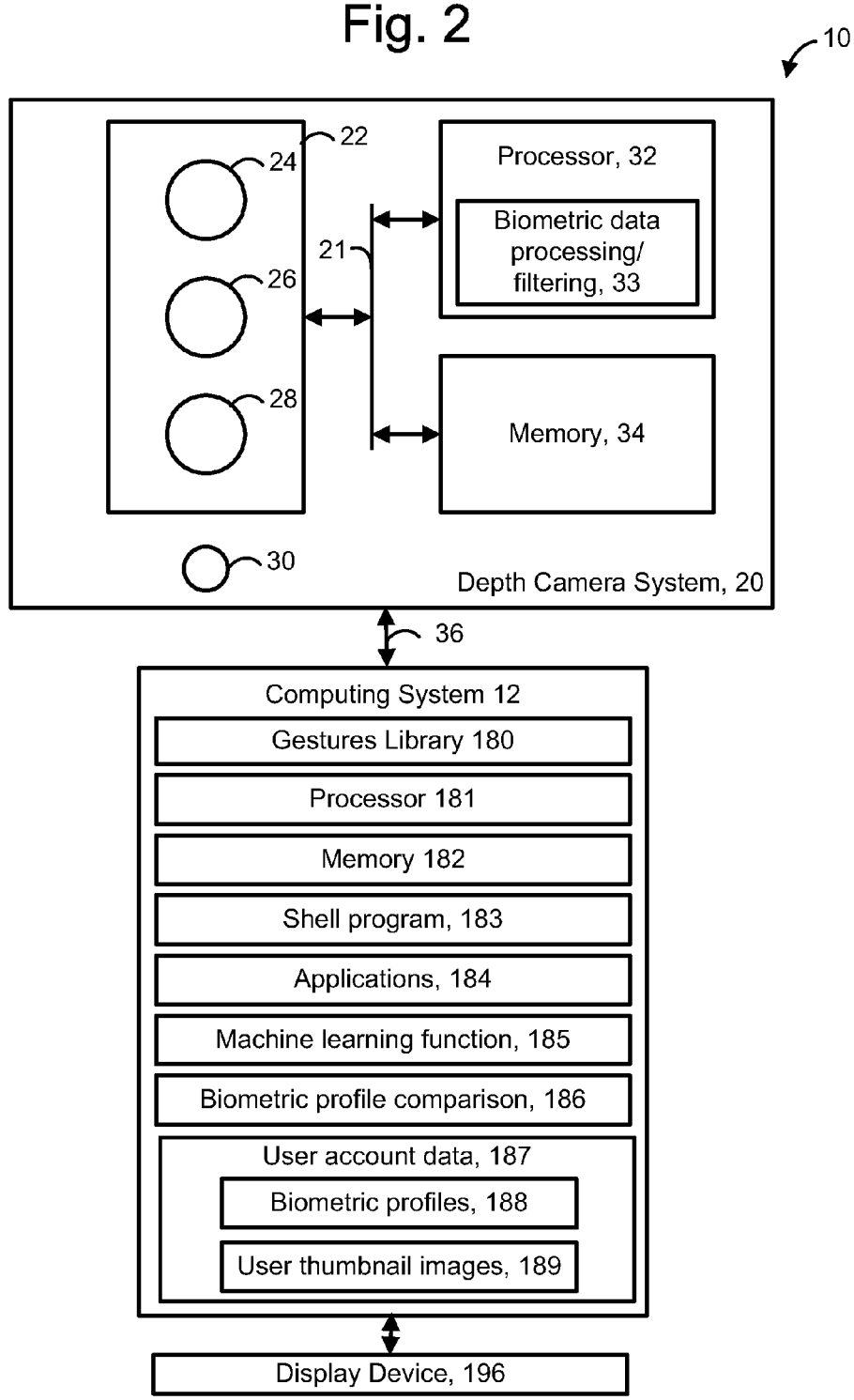
FIG. 2 depicts an example block diagram of the interactive system of FIG. 1.

FIG. 2 depicts an example block diagram of the interactive system 10 of FIG. 1. The depth camera system 20, a type of sensor, may be configured to capture video with depth information including a depth image that may include depth values, via any suitable technique including, for example, time-of-flight, structured light, stereo vision, or the like. The depth camera system 20 may organize the depth information into "Z layers," or layers that may be perpendicular to a Z axis extending from the depth camera along its line of sight.

The depth camera system 20 may include an image camera component 22 that captures the depth image of a scene in a physical space. The depth image may include a two-dimensional (2-D) pixel area of the captured scene, where each pixel in the 2-D pixel area has an associated depth value which represents a linear distance from the image camera component 22, thereby providing a 3-D depth image.

The image camera component 22 may include an illuminator 24, such an infrared (IR) light emitter 24, an image sensor 26, such as an infrared camera, and a red-green-blue (RGB) camera 28 that may be used to capture the depth image of a scene or provide an additional camera for other applications.

Active infrared imagery is especially useful for performing biometric identification processes such as enrollment and recognition. In contrast, with biometric recognition using color imagery, performance can be poor in low light environments which are commonly encountered. Moreover, there is a high sensitivity to non-uniform lighting which are also commonly encountered due to light sources such as lamps, overhead lights, and natural light from windows. These different light sources create highlights and shadows on the face of the user, rendering many facial recognition systems ineffective. In contrast, with active infrared imagery for biometric recognition, the users are uniformly lit and can be recognized across a wide variety of living room environments, including environments with very low lighting levels.

A 3-D depth camera is formed by the combination of the infrared emitter 24 and the infrared sensor 26. For example, in a time-of-flight analysis, the illuminator 24 emits infrared light onto the physical space and the image sensor 26 detects the backscattered light from the surface of one or more targets and objects in the physical space. In some embodiments, pulsed infrared light may be used such that the time between an outgoing light pulse and a corresponding incoming light pulse is measured and used to determine a physical distance from the depth camera system 20 to a particular location on the targets or objects in the physical space. The phase of the outgoing light wave may be compared to the phase of the incoming light wave to determine a phase shift. The phase shift may then be used to determine a physical distance from the depth camera system to a particular location on the targets or objects.

A time-of-flight analysis may also be used to indirectly determine a physical distance from the depth camera system 20 to a particular location on the targets or objects by analyzing the intensity of the reflected beam of light over time via various techniques including, for example, shuttered light pulse imaging.

In another example embodiment, the depth camera system 20 may use a structured light to capture depth information. In such an analysis, patterned light (i.e., light displayed as a known pattern such as grid pattern or a stripe pattern) may be projected onto the scene via, for example, the illuminator 24. Upon striking the surface of one or more targets or objects in the scene, the pattern may become deformed in response. Such a deformation of the pattern may be captured by, for example, the image sensor 26 and/or the RGB camera 28 and may then be analyzed to determine a physical distance from the depth camera system to a particular location on the targets or objects.

The depth camera system 20 may further include a microphone 30 which includes, e.g., a transducer or sensor that receives and converts sound waves into an electrical signal. Additionally, the microphone 30 may be used to receive audio signals such as sounds that are provided by a person to control an application that is run by the computing system 12. The audio signals can include vocal sounds of the person such as spoken words, whistling, shouts and other utterances as well as non-vocal sounds such as clapping hands or stomping feet. In one option, the microphone is directional such that it has the ability to determine the direction a sound is from.

The depth camera system 20 may include a processor 32 that is in communication with the 3-D depth camera 22. The processor 32 may include a standardized processor, a specialized processor, a microprocessor, or the like that may execute instructions including, for example, instructions for receiving a depth image; generating a grid of voxels based on the depth image; removing a background included in the grid of voxels to isolate one or more voxels associated with a human target; determining a location or position of one or more extremities of the isolated human target; adjusting a model based on the location or position of the one or more extremities, or any other suitable instruction, which will be described in more detail below.

The depth camera system 20 may further include a memory component 34 that may store instructions that are executed by the processor 32, as well as storing images or frames of images captured by the 3-D camera or RGB camera, or any other suitable information, images, or the like. According to an example embodiment, the memory component 34 may include random access memory (RAM), read only memory (ROM), cache, flash memory, a hard disk, or any other suitable tangible computer-readable storage component. The memory component 34 may be a separate component in communication with the image capture component 22 and the processor 32 via a bus 21. According to another embodiment, the memory component 34 may be integrated into the processor 32 and/or the image capture component 22. The processor 32 includes a biometric data processing/filtering function 33 for processing biometric data such as described in connection with step 502 of FIG. 5A.

The depth camera system 20 may be in communication with the computing system 12 via a wired and/or a wireless communication link 36. According to one embodiment, the computing system 12 may provide a clock signal to the depth camera system 20 via the communication link 36 that indicates when to capture image data from the physical space which is in the field of view of the depth camera system 20.

Additionally, the depth camera system 20 may provide the depth information and images captured by, for example, the image sensor 26 and/or the RGB camera 28, and/or a skeletal model that may be generated by the depth camera system 20 to the computing system 12 via the communication link 36.

The computing system 12 may then use the model, depth information, and captured images to control an application. The computing system 12 may provide a biometric recognition system. For example, as shown in FIG. 2, the computing system 12 may include a gestures library 180, such as a collection of gesture filters, each having information concerning a gesture that may be performed by the skeletal model (as the user moves). For example, a gesture filter can be provided for various hand gestures, such as swiping or flinging of the hands. By comparing a detected motion to each filter, a specified gesture or movement which is performed by a person can be identified. An extent to which the movement is performed can also be determined.

The data captured by the depth camera system 20 in the form of the skeletal model and movements associated with it may be compared to the gesture filters in the gesture library 180 to identify when a user (as represented by the skeletal model) has performed one or more specific movements. Those movements may be associated with various controls of an application.

The computing system may also include a processor 181 for executing instructions which are stored in a memory 182 to provide audio-video output signals to the display 196 and to achieve other functionality as described herein. The computing system further includes a shell program 183, applications 184, a machine learning function 185, a biometric profile (template) comparison function 186 and user account data 187, including biometric profiles 188 and user thumbnail images 189. A thumbnail image may be a static image of a user which is stored in a file and used when providing on-screen notifications to the user as discussed further below.

The shell program is a high level user interface which the user may access before accessing an individual application such as a game (a "title"). For example, the shell program may contain a menu which organizes and describes the different applications. Typically, there are many applications available. The machine learning function is used to update the biometric profiles 188 over time as additional biometric data becomes available. A machine learning process function maps inputs such as biometric data of a user from the depth camera to an output such as the biometric data in the biometric profile of a user. In one approach, the mapping uses a neural network. For example, see U.S. Pat. No. 6,944,319, issued Sep. 13, 2005, titled "Pose-invariant face recognition system and process," and incorporated herein by reference.

The biometric profile comparison function 186 compares biometric data received from the depth camera to biometric data in the biometric profile of a user. In one approach, comparisons can be made to biometric profiles of different users to find one profile which is a best match, a second best match and so forth. The result of each comparison can be assigned a confidence level indicating a likelihood that the match is correct.

The user account data may be provided for each user which has an account associated with the computing system. In one approach, one or more biometric profiles, a user thumbnail image 189, a user name and a password are associated with each user account.

In one approach, the biometric recognition system is continuously running on the computing system. The biometric recognition system can identify all tracked bodies across all applications (including in the shell), so that users are often already identified by the time their identity is to be known by the currently running application. This gives the perception that biometric identity is instantaneous. Also, since users are being continuously identified, this allows the biometric identity system to perform offline semi-supervised machine learning, improving biometric recognition accuracy over time. Semi-supervised learning is a class of machine learning techniques that make use of both labeled and unlabeled data for training—typically a small amount of labeled data with a large amount of unlabeled data. Semi-supervised learning falls between unsupervised learning (without any labeled training data) and supervised learning (with completely labeled training data).

Figure 3:
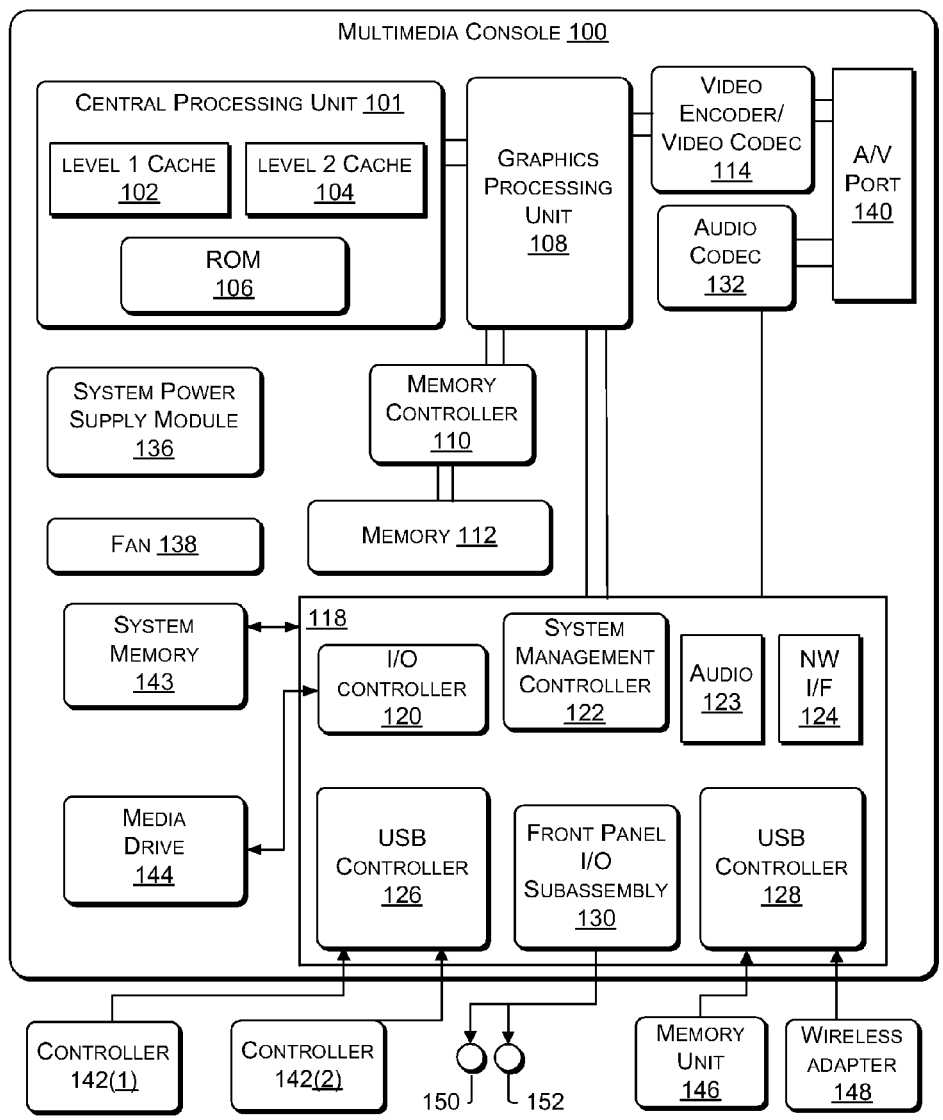
FIG. 3 depicts an example block diagram of a computing system that may be used in the interactive system of FIG. 1.

FIG. 3 depicts an example block diagram of a computing system that may be used in the interactive system of FIG. 1. The computing system may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The console 100 may receive additional inputs from the depth camera system 20 of FIG. 2, including the cameras 26 and 28.

Figure 4:
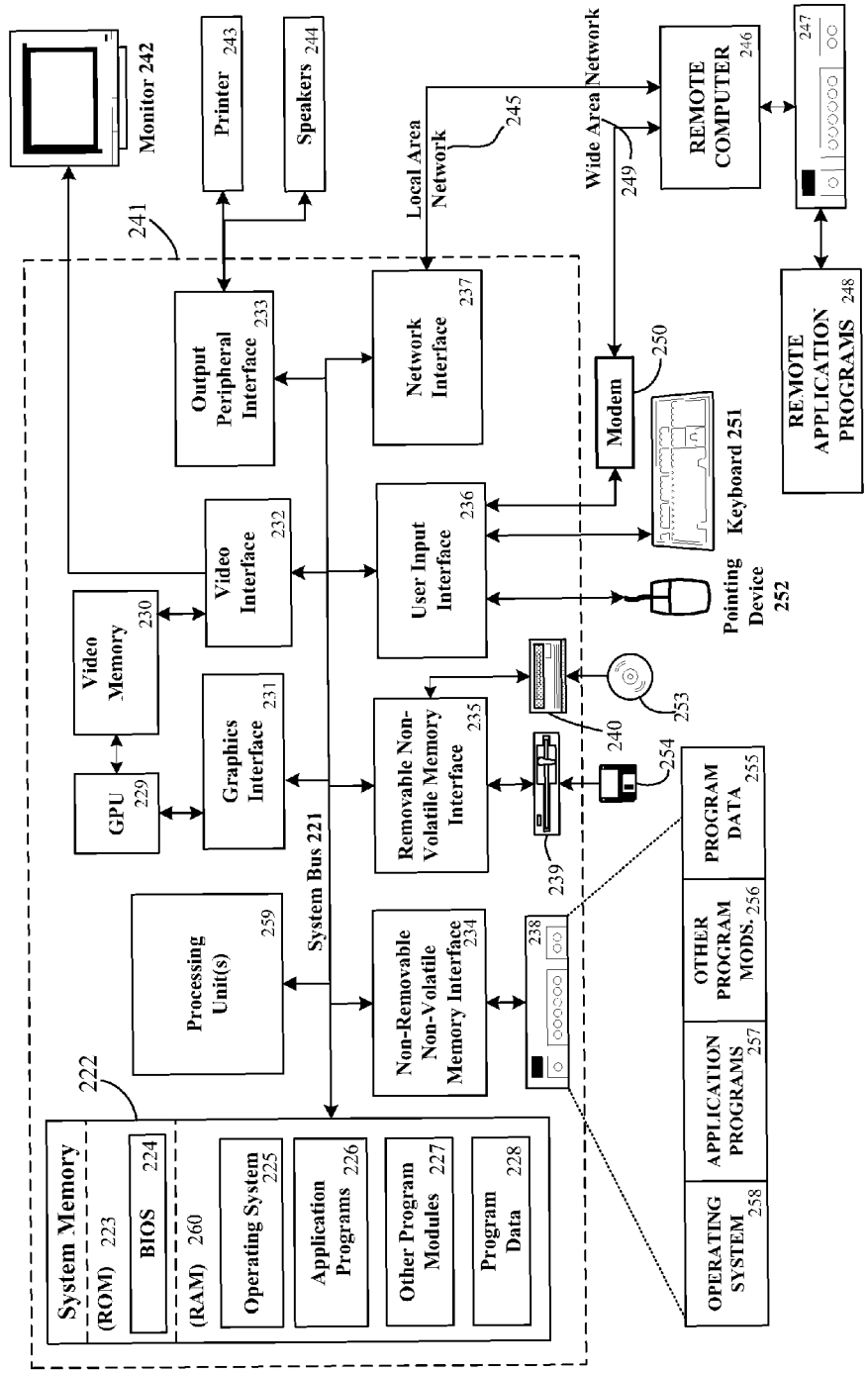
FIG. 4 depicts another example block diagram of a computing system that may be used in the interactive system of FIG. 1.

FIG. 4 depicts another example block diagram of a computing system that may be used in the interactive system of FIG. 1. In an interactive system, the computing system can be used to interpret one or more gestures or other movements and, in response, update a visual space on a display. The computing system 20 comprises a computer 241, which typically includes a variety of tangible computer-readable storage media. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. A graphics interface 231 communicates with a GPU 229. By way of example, and not limitation, operating system 225, application programs 226, other program modules 227, and program data 228 are provided.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer-readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media provide storage of computer-readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The depth camera system 20 of FIG. 2, including cameras 26 and 28, may define additional input devices for the console 100. A monitor 242 or other type of display is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted in FIG. 4. The logical connections include a local area network (LAN) 245 and a wide area network (WAN) 249, but may also include other networks.

Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, remote application programs 248 reside on memory device 247. It will be appreciated that the network connections shown are exemplary and other means of establishing a communications link between the computers may be used.

The computing system can include a tangible computer-readable storage device or apparatus having computer-readable software embodied thereon for programming at least one processor to perform methods as described herein. The tangible computer-readable storage device can include, e.g., one or more of components 222, 234, 235, 230, 253 and 254. Further, one or more processors of the computing system can provide processor-implemented methods as described herein. The GPU 229 and the processing unit 259 are examples of processors.

FIG. 5A depicts a method for using biometric data as an input in an interactive system. As an overview, whenever a body is being tracked in the field of view, biometric data of the body is gathered and cached. The biometric data is not used until a sign in of a user occurs. Once the user shows an intent to engage, the biometric data is used to attempt to sign in the user. If a user is identified by the biometric data, a notification is provided that the user is being signed in. The user can respond if the identification is incorrect by selecting his true identity. If a user is not identified by the biometric data, a notification is provided which the user can respond to by selecting his identity. Once the user selects his identity, either in response to an incorrect identification or no identification, the biometric data which has been cached is applied to create or augment the user's biometric profile. The cached biometric data could represent several minutes worth of data, for instance. Moreover, additional biometric data can be gathered after the user has been positively identified and used to augment the user's biometric profile while the user is signed in and in the field of view.

The rate at which the biometric data is gathered depends on the scenario. For example, if a first user has been identified and a second user enters the field of view, a higher priority can be placed on gathering biometric data on the second user than on the first user. The data gathering for the first user could stop or be slowed while the data gathering for the second user occurs at a relatively high rate. The computational resources of the system are thus considered.

Further, the biometric data samples can be tagged with meta data indicating data-gathering conditions such as: a distance of the user from the sensors, time of day and ambient lighting level. In some cases, the data gathering can emphasize data-gathering conditions for which there is relatively little data. For instance, in a morning session of a user on one day, a relatively high amount or rate of biometric data can be gathered, e.g., a certain number of samples. In a night session of the user on the one day, a relatively high amount or rate of biometric data can be gathered. In a morning session of the user on another day, a relatively low amount or rate of biometric data can be gathered since there is already a lot of data for that category. The user's appearance could be linked to the time of day based on factors such as clothes worn, bodily appearance (shaved or not, combed hair or not) and so forth.

Similarly, a relatively high rate can be used in one or more sessions when the user is 5-10 feet from the sensor, until an adequate amount of biometric data has been gathered for that distance category. After that, the rate can decrease or the gathering can stop for that category. The categories can be combined as well, e.g., a category for low lighting conditions with a distance of 5-10 feet, a category for high lighting conditions with a distance of 5-10 feet, a category for low lighting conditions with a distance of 10-15 feet, a category for high lighting conditions with a distance of 10-15 feet, and so forth.

The data gathering rate can also vary based on what the user is doing, e.g., a level of activity or motion. For example, the data gathering rate can be reduced when the user is inactive, e.g., sitting on a sofa for a long period, and increased when the user is more active, e.g., moving around. Gathering data when the user is active can allow capturing of data when the user has different body or head positions or postures.

Generally, a rate of obtaining the biometric data can be based on a current biometric data-gathering condition and an amount of biometric data which has been gathered with the current biometric data-gathering condition. The rate is relatively higher when the amount of biometric data which has been gathered with the current biometric data-gathering condition is relatively lower.

The voice can also be used in the natural user interface and correlated to the body position. The user's voice can be used to confirm the user physical identity, as an alternative or addition to using a gamepad or gesture.

Step 500 includes obtaining biometric data from one or more users in a field of view of a sensor (or multiple sensors). Step 502 includes processing the biometric data. See, e.g., FIGS. 5B and 5C for further details.

Step 503 detects an intent by the user to engage with the computing system. This triggers the providing of biometric data to the shell program. This provides two major benefits. First, waiting until a user engages with the system provides the biometric identity system more time to collect data to recognize the user. This increases the accuracy of recognition. Second, waiting until the user engages is a more intuitive time to take action on the biometric data, including signing the user in, or providing feedback that they were not recognized. Intent to engage or interact with the computing system can involve, e.g., detecting a movement of a user, detecting a location of a controller device which is correlated to a position of the first user in the field of view, or detecting a voice command which is correlated to a position of the first user in the field of view. Other examples of intent to engage are in U.S. Pat. No. 8,334,842, titled "Recognizing user intent in motion capture system," issued Dec. 18, 2012, and incorporated herein by reference.

Step 504 includes providing the processed biometric data to a shell program of a computing system. At step 506, the shell program manages the biometric data, e.g., to identify a user and update a biometric profile. Further details of step 506 are provided, e.g., in connection with FIGS. 7A to 10B.

FIG. 5B depicts an example method for processing biometric data as set forth in step 502 of FIG. 7. Step 510 includes detecting a human target in the field of view of a sensor, e.g., using the depth camera system 20 and/or the computing system 12, 100 or 420 as discussed in connection with FIGS. 2-4. One or more human targets can be scanned to generate a model such as a skeletal model, a mesh human model, or any other suitable representation of a person. In a skeletal model, each body part may be characterized as a mathematical vector defining joints and bones of the skeletal model. Body parts can move relative to one another at the joints.

The model may then be used to interact with a shell program or other application that is executed by the computing system. Step 512 can occur when an application is started or launched, or at other times.

The person may be scanned to generate a skeletal model that may be tracked such that physical movements or motions of the user may act as a real-time user interface that adjusts and/or controls parameters of an application. For example, the tracked movements of a person may be used to move an avatar or other on-screen character in an electronic role-playing game; to control an on-screen vehicle in an electronic racing game; to control the building or organization of objects in a virtual environment; or to perform any other suitable control of an application.

According to one embodiment, at step 510, depth information is received, e.g., from the depth camera system. The depth camera system may capture or observe a field of view that may include one or more targets. In an example embodiment, the depth camera system may obtain depth information associated with the one or more targets in the capture area using any suitable technique. The depth information may include a depth image or map having a plurality of observed pixels, where each observed pixel has an observed depth value.

The depth image may be downsampled to a lower processing resolution so that it can be more easily used and processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information such that the depth information may used to generate a model such as a skeletal model (see FIG. 6A).

Step 510 can determine whether the depth image includes a human target. This can include flood filling each target or object in the depth image comparing each target or object to a pattern to determine whether the depth image includes a human target. For example, various depth values of pixels in a selected area or point of the depth image may be compared to determine edges that may define targets or objects as described above. The likely Z values of the Z layers may be flood filled based on the determined edges. For example, the pixels associated with the determined edges and the pixels of the area within the edges may be associated with each other to define a target or an object in the capture area that may be compared with a pattern.

The pattern to which each target or object is compared may include one or more data structures having a set of variables that collectively define a typical body of a human. Information associated with the pixels of, for example, a human target and a non-human target in the field of view, may be compared with the variables to identify a human target. In one embodiment, each of the variables in the set may be weighted based on a body part. For example, various body parts such as a head and/or shoulders in the pattern may have weight value associated therewith that may be greater than other body parts such as a leg. According to one embodiment, the weight values may be used when comparing a target with the variables to determine whether and which of the targets may be human. For example, matches between the variables and the target that have larger weight values may yield a greater likelihood of the target being human than matches with smaller weight values.

Step 512 includes scanning the human target for body parts. The human target may be scanned to provide measurements such as length, width, or the like associated with one or more body parts of a person to provide an accurate model of the person. In an example embodiment, the human target may be isolated and a bitmask of the human target may be created to scan for one or more body parts. The bitmask may be created by, for example, flood filling the human target such that the human target may be separated from other targets or objects in the capture area elements. The bitmask may then be analyzed for one or more body parts to generate a model such as a skeletal model, a mesh human model, or the like of the human target. For example, according to one embodiment, measurement values determined by the scanned bitmask may be used to define one or more joints in a skeletal model. The one or more joints may be used to define one or more bones that may correspond to a body part of a human.

For example, the top of the bitmask of the human target may be associated with a location of the top of the head. After determining the top of the head, the bitmask may be scanned downward to then determine a location of a neck, a location of the shoulders and so forth. A width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like. Some body parts such as legs, feet, or the like may be calculated based on, for example, the location of other body parts. Upon determining the values of a body part, a data structure is created that includes measurement values of the body part. The data structure may include scan results averaged from multiple depth images which are provide at different points in time by the depth camera system.

Step 514 includes generating a model of the human target. In one embodiment, measurement values determined by the scanned bitmask may be used to define one or more joints in a skeletal model. The one or more joints are used to define one or more bones that correspond to a body part of a human. One or more joints may be adjusted until the joints are within a range of typical distances between a joint and a body part of a human to generate a more accurate skeletal model. The model may further be adjusted based on, for example, a height associated with the human target.

Step 516 includes generating facial recognition data, e.g., as discussed further in connection with FIG. 5C. Step 518 includes processing visible light images to identify hair color and clothing color and pattern, to assist in identifying a particular user. For example, a primary color of the clothing can be determined. See the color data function 538 in FIG. 5C. Step 520 includes tracking the human target. The human target can be tracked by updating the person's location several times per second. As the user moves in the physical space, information from the depth camera system is used to adjust the skeletal model such that the skeletal model represents a person. In particular, one or more forces may be applied to one or more force-receiving aspects of the skeletal model to adjust the skeletal model into a pose that more closely corresponds to the pose of the human target in physical space.

FIG. 5C depicts an example data flow 530 for processing biometric data in accordance with step 502 of FIG. 5A. The data flow includes infrared camera data 532 such as from the depth camera system 20. This can be the raw image data which is obtained by the camera. This image data is processed to provide depth data 534, and the depth data is processed to provide body data 536, such as a skeletal model of the body. Further details are provided in connection with FIGS. 5B and 6A. Color data 538, such as from a visible light camera, can be included with user biometric profiles 540. A face detection process 542 uses the body data to determine the location of a user's face in relation to the overall body. Optionally, the location of a user's face can be determined without reference to a model of the overall body. A face alignment 544 process aligns data representing the face with the infrared camera data. A method used to align the face with infrared camera data can involve identifying particular facial feature locations including the centers of the eyes, the tip of the nose and the corners of the mouth. A head orientation process 546 determines an orientation of the head based on the face alignment data and the infrared camera data.

A face recognition process 548 recognizes a particular user's face based on the color data, user biometric profiles and infrared camera data. A degree of matching can be determined between one set of facial alignment points and each of one or more other sets of facial alignment points. For instance, the one set can be from the sensor, and each of one or more other sets can be in the biometric profile of a respective user. A confidence level of each match can be provided and ranked to find a best match, a second best match and so forth. The confidence level can be compared to a threshold to determine whether it provides an acceptable match and whether (and how) the user should be prompted to confirm the match.

Popular facial recognition algorithms include Principal Component Analysis using Eigen faces, Linear Discriminate Analysis, Elastic Bunch Graph Matching using the Fisher face algorithm, Hidden Markov model, neuronal motivated dynamic link matching, 3D face recognition, skin texture analysis and the Joint-Bayesian facial recognition algorithm. Facial recognition algorithms can identify a face from a range of viewing angles including a profile view.

A pairing of the body or face to a user is stored in the data 550.

FIG. 6A depicts an example model of a human target as set forth in step 514 of FIG. 5B. The model 600 is facing the depth camera, in the −z direction, so that the cross-section shown is in the x-y plane. Note the vertical y-axis and the lateral x-axis. A similar notation is provided in FIGS. 1 and 6D. The model includes a number of reference points, such as the top of the head 602, bottom of the head or chin 613, right shoulder 604, right elbow 606, right wrist 608 and right hand 610, represented by a fingertip area, for instance. The head 601 is also depicted. The right and left side is defined from the user's perspective, facing the camera. The model also includes a left shoulder 614, left elbow 616, left wrist 618 and left hand 620. A waist region 622 is also depicted, along with a right hip 624, right knew 626, right foot 628, left hip 630, left knee 632 and left foot 634. A shoulder line 612 is a line, typically horizontal, between the shoulders 604 and 614. An upper torso centerline 625, which extends between the waist region 622 and chin 613, for example, is also depicted.

FIG. 6B depicts an example of facial recognition data as set forth in step 516 of FIG. 5B. The head 601 of the model 600 includes a number of facial alignment points such as the centers of the eyes 603 and 605, the tip of the nose 607 and the corners of the mouth 609 and 611.

FIG. 6C depicts an example process for filtering biometric data based on head orientation to provide facial recognition data in accordance with step 516 of FIG. 5B. Head orientation information can be used to filter out sample images being compared to a reference image, making a better "apples to apples" comparisons between images and providing increased recognition accuracy. Further, if indicated, the recognition system can restrict its collection of reference images to certain head orientations, producing more robust training imagery for a particular user. The range of head orientations in a biometric profile is constrained based on the filtering of biometric samples based on head orientation. For example, the system may filter out all biometric samples in which the head was oriented more than a specified number of degrees away from the sensor in yaw, pitch, or roll. Within this range, head orientation is further used to compare images with similar orientations, thus providing more accurate recognition results.

Step 640 initially filters out unsuitable biometric data. Generally, biometric data which is not most suitable for biometric recognition can be filtered out and not compared to a biometric profile. This approach avoids incorrect recognitions and reduces processing and storage requirements. For example, data can be removed when the user is too far away from the sensor, when the user's face is blocked by their hand or other object, when image noise levels are too high, e.g., due to vibration, or based on other criterion.

Of the remaining data, step 642 includes processing biometric data to determine a head orientation of a user. It has been found that filtering out based on head orientation is useful. For example, the general orientation of the head can be determined before determining the facial alignment points. The head orientation can be expressed in terms of the world coordinate system, such as by an angular amount of pitch, yaw and roll. An example of yaw is provided in FIG. 6D. Step 644 filters out biometric data for head orientations outside a defined range. Thus, a method can include performing a filtering process so that biometric data used in updating a biometric profile is within a defined range of head orientations of a user, e.g., in which the user is generally facing the sensor. An example is a yaw of +/−45 degrees. The pitch can be in a range of, e.g., +/−30 degrees relative to the z-axis. Filtering based on the angle of roll of the head could also be performed.

Step 646 can optionally be used to classify the biometric data into multiple defined ranges of head orientation. This approach divides the biometric data into different classes which are processed separately during the biometric matching process. For example, classes can be defined for a head yaw angle in ranges from −22.5 degrees to −45 degrees, 0 to −22.5 degrees, 0-22.5 degrees and 22.5 degrees to 45 degrees. Further subdivisions can be made based on pitch and/or roll. The biometric data in the profiles can similarly be stored in the different classes. Thus, a biometric recognition can be performed for one of the classes but not the others. By grouping biometric data from similar head orientations, the accuracy of the comparisons can be increased. In fact, a higher minimum acceptable confidence level can be used for a biometric comparison in a class of head orientations than for a biometric comparison which does not take head orientation into account. Thus, a method can include performing a filtering process so that biometric data used in updating a biometric profile is within a plurality of defined ranges of head orientations of a user in which the user is facing a sensor. Moreover, the biometric data of the biometric profile is also within the plurality of defined range of head orientations. The biometric data of the biometric profile is updated separately for each defined range of head orientations.

FIG. 6D depicts an example head orientation in accordance with step 642 of FIG. 6C. Recall that the x-z plane is a horizontal plane parallel to the ground. An overhead view of the user 600 is depicted. The z-axis extends along a line 643.

A line 641 is perpendicular to the shoulder line 612, and at an angle of 45 degrees to the z-axis, so the amount of yaw is 45 degrees. A line 645 is at an angle of 22.5 degrees to both lines 641 and 643. In one approach, as discussed in connection with FIG. 6C, head orientations between lines 641 and 645 can represent one class of head orientations, and head orientations between lines 643 and 645 can represent another class of head orientations.

Figure 7A:
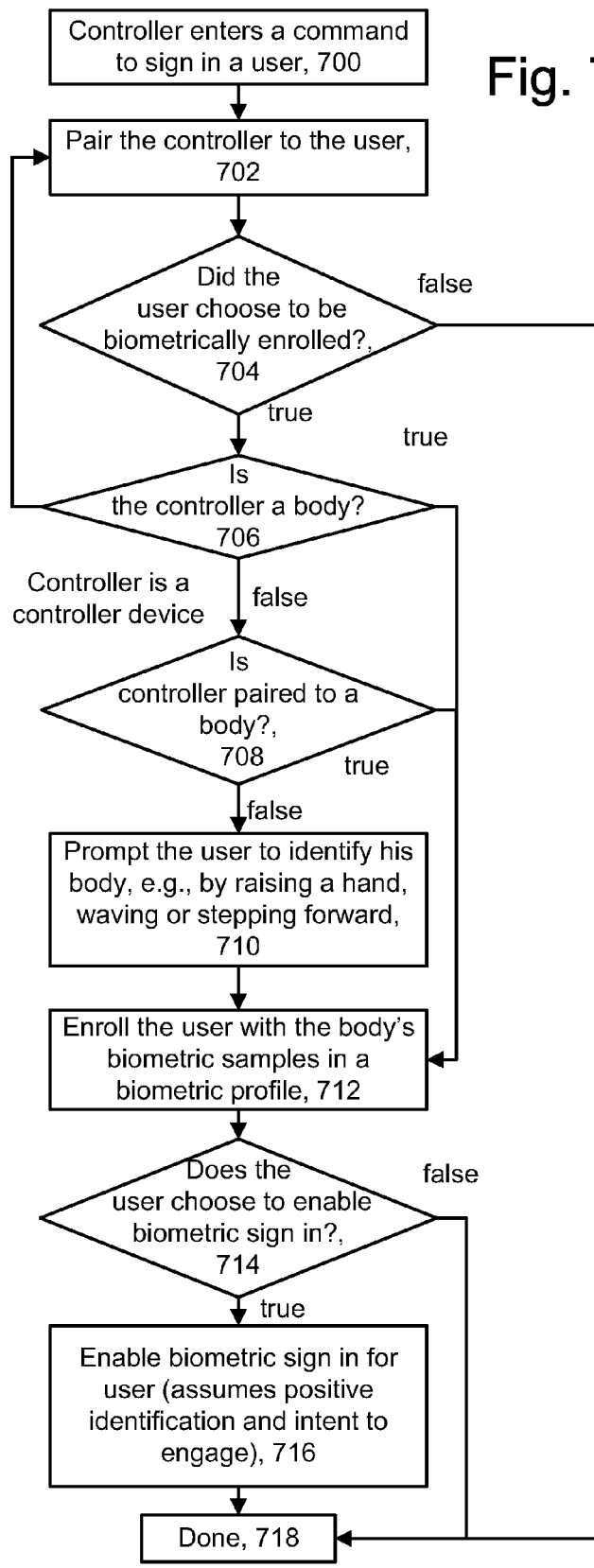
FIG. 7A depicts an example process for enrolling a user with a computing system, in accordance with step 506 of FIG. 5A.

FIG. 7A depicts an example process for enrolling a user with a computing system, in accordance with step 506 of FIG. 5A. When a user signs in to the shell program, the user can be led through a set of prompts to enter their account credentials and confirm their identity. After completing this process, this user becomes a biometrically enrolled, known user on the system and can access content via the computing system. For example, the user can interact with an enrollment user interface by entering commands in different ways. In one approach, the user uses a controller device which communicates signals to the computing system. The controller device may have mechanisms such as buttons, keys and a joystick which allow a user to navigate a user interface. In another approach, the user performs gestures which are recognized by the gesture library and associated with specific commands. In another approach, voice commands of the user are recognized using speech detection. In another approach, movements of the user such as pointing towards menu selections of the user interface are recognized as commands. In the case of gestures or other movements, the body itself becomes a controller in a natural user interface. Example user interfaces are discussed further below, e.g., at FIGS. 11A to 11N.

At step 700, a controller (a user's body or a controller device, for instance) enters a command to sign in a user. The user may provide his or her name, e.g., Ben, for instance. Step 702 pairs, e.g., associates, the controller with the user. For example, the computing system can associate the name "Ben" with the body which is being detected or with a controller device from which commands are being received. A new account can be created and assigned to the user. Decision step 704 determines if the user chooses to be biometrically enrolled. An appropriate user interface can be used in which the user provides commands for the desired settings. If decision step 704 is false, the process is done at step 718. In this case, the user opts out of being biometrically recognized. If decision step 704 is true, decision step 706 determines if the controller is a body. If decision step 706 is true, the user's body is already being tracked so that the user can be enrolled with the body's biometric samples in a biometric profile linked to the account at step 712.

If decision step 706 is false, this indicates the user is entering commands using a controller device, for instance, rather than using bodily movements. Decision step 708 determines whether the controller is paired to a body. For example, the location of the controller device in the field of view may be detected and associated with a body which is detected at that location. The computing system may have a directional antenna which receives signals transmitted by the controller device, such as radio frequency signals. One example is RF transmission at 2.4 GHz. A relative position of the controller device to the antenna of the computing system can then be determined and matched up with a particular user in the field of view, even when there are multiple users are in the field of view. For example, the location of the gamepad or other controller device may be tracked by the infrared camera itself and be used to correlate the controller device and the body that is holding it. This user's body is then linked to the controller device. See FIGS. 12A to 12H, for example.

If decision step 708 is true, the user's body is already being tracked so that step 712 follows. If decision step 708 is false, step 710 prompts the user to identify his or her body, e.g., by performing a gesture such as raising a hand, waving or stepping forward or a voice command such as "yes." This may be done, e.g., when there are multiple users in the field of view or when it is otherwise desired to confirm the user's identity with certainty, and step 712 follows.

Decision step 714 determines if the user chooses to enable biometric sign in for future sessions with the computing system. A session may be a period in which a user is signed in. This preference can be stored in the user's account. If decision step 714 is true, step 716 enables a biometric sign in for the user. In this case, the user is automatically signed in when they are detected in the field of view, identified by the biometric identity system, and the system detects the user's intent to engage. If decision step 714 is false, the process is done at step 718.

FIG. 7B depicts another example process for enrolling or signing in a user with a computing system, in accordance with step 506 of FIG. 5A. The process can be initiated based on the user's intent to engage with the computing system, and the presence of multiple users is addressed. At step 720, biometric data is obtained from one or more users in a field of view of a sensor. Step 722 compares the biometric data to biometric profiles of one or more users in one or more accounts. At step 724, no match is found, in this example. That is, a match with a confidence level above a minimum threshold is not found. Decision step 726 determines if there is an intent by a user to engage with the computing system. This can be determined in different ways. For example, a user may make a voice command indicating an intent to engage. Specific gestures, movement or a position of a user in the field of view can indicate an intent to engage. If decision step 726 is false, additional biometric data is obtained at step 738 and the comparison at step 722 is repeated. If decision step 726 is true, decision step 728 determines if multiple users are detected in the field of view.

When multiple users are present in the field of view, it is useful to prompt the user to identify himself or herself to ensure that the enrollment is made by the correct user. If decision step 728 is true, step 730 displays a real-time image of the users with one user visually distinguished, e.g., highlighted. This is the user who the computing system believes has indicated the intent to engage. The system displays a prompt when there are multiple existing identities that match the user who has shown intent to engage. See FIG. 11B or 11G for an example. The real-time image can be a video feed or a still image of the users taken at the time of the interaction. Step 732 prompts the user to identify himself or herself from among the multiple users. At step 734, the user identifies himself or herself, such as by raising a hand, waving or stepping forward or a voice command such as "yes." A voice command can be recognized by voice recognition techniques or by using a directional antenna which indicates a direction of the voice relative to the computing system. Step 736 signs in or enrolls the user. If decision step 728 is false, step 740 displays a real-time image of the user, and step 732 follows.

Figure 8A:
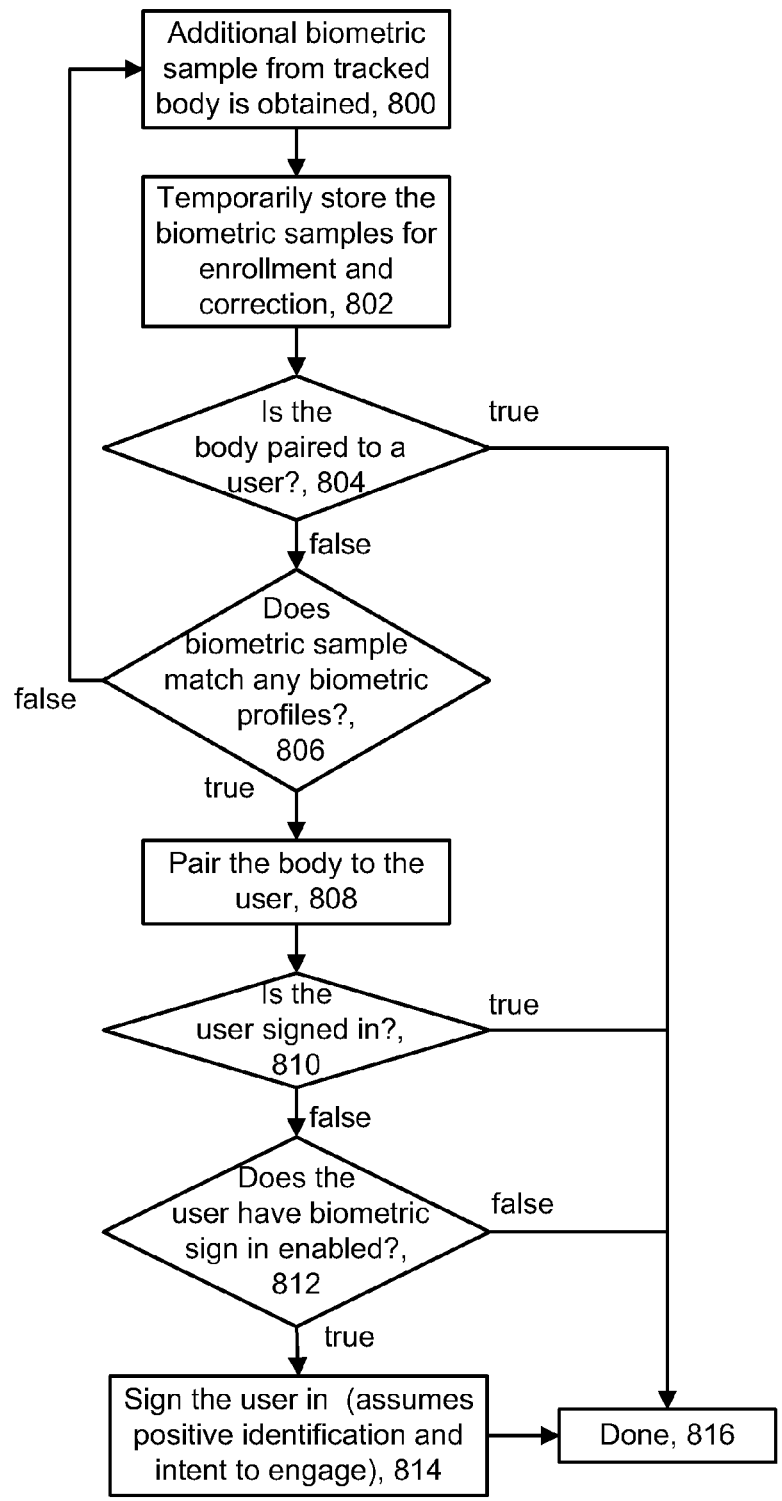
FIG. 8A depicts an example process for biometric recognition of a user in accordance with step 506 of FIG. 5A.

FIG. 8A depicts an example process for biometric recognition of a user in accordance with step 506 of FIG. 5A. At step 800, an additional biometric sample from a tracked body is obtained. Step 802 temporarily stores the biometric samples for enrollment and correction. Decision step 804 determines if the body is paired to a user. If decision step 804 is true, the process is done at step 816. If decision step 804 is false, decision step 806 determines if the biometric sample matches any biometric profiles. If decision step 806 is false, additional samples are obtained at step 800. If decision step 806 is true, step 808 pairs the body to the user associated with the matching biometric profile. If the user is signed in at decision step 810, the process is done. If the user is not signed in at decision step 810, decision step 812 determines if the user has a biometric sign in enabled. If decision step 812 is false, the process is done. If decision step 812 is true, the user is automatically signed in to their account at step 814 assuming the user has been positively identified and has shown an intent to engage.

Thus, in the event where a matching biometric profile is found, if the user has not been signed in, the system does not automatically sign the user in and pair him to his body. The system waits until the user has shown intent to engage before signing the identified user in and pairing him to his body. Subsequently, when the user is already signed in, if he is re-identified, he is automatically paired back to his body.

Figure 8B:
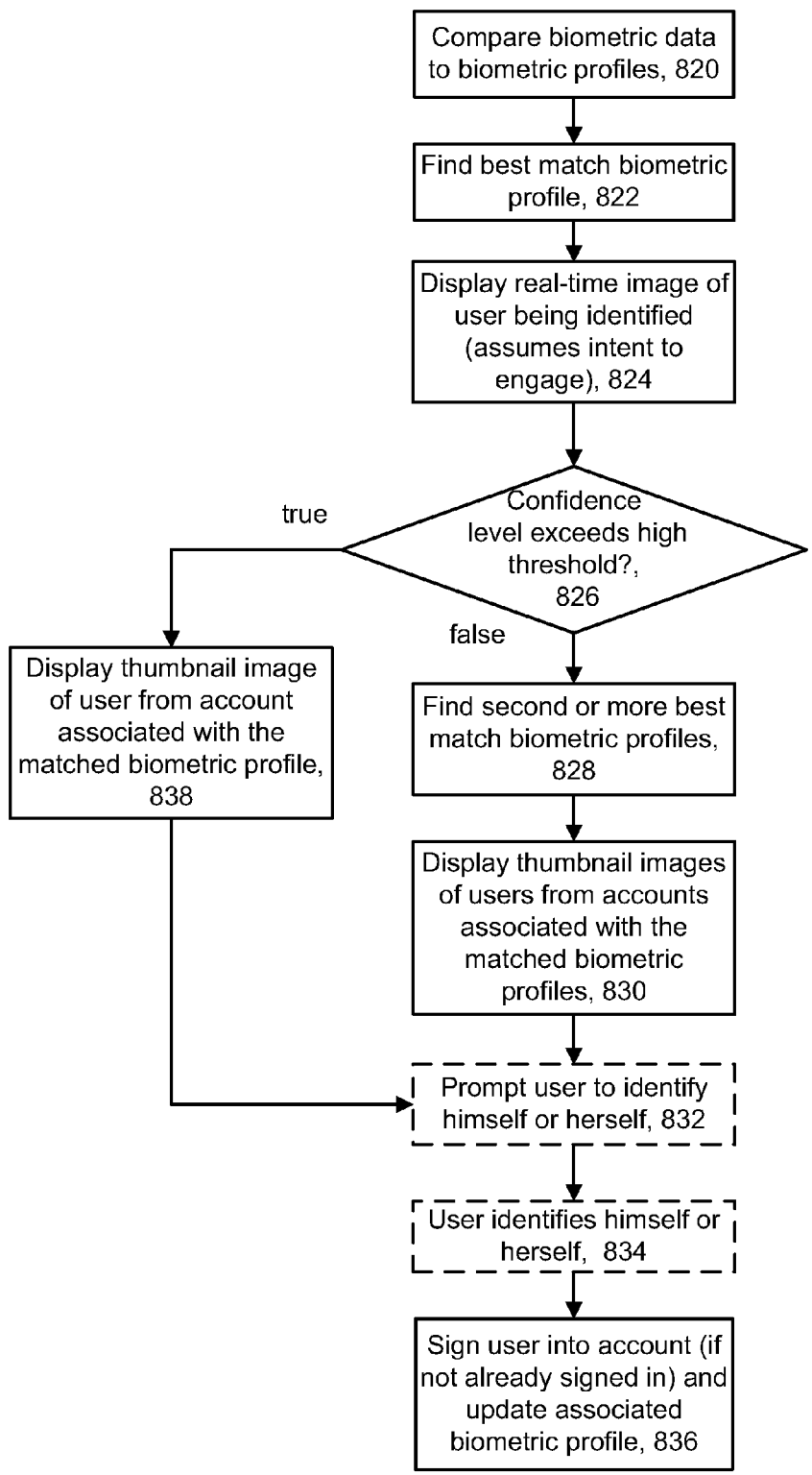
FIG. 8B depicts an example process for biometric recognition of a user in accordance with step 506 of FIG. 5A, where a confidence level of a match is determined.

FIG. 8B depicts an example process for biometric recognition of a user in accordance with step 506 of FIG. 5A, where a confidence level of a match is determined. Various techniques to determine a confidence level or a similarity score of a match can be used. For example, a confidence level can range between 0-100% where 100% indicates a certainty of a match. Step 820 compares biometric data received from a sensor to biometric data in biometric profiles. Step 822 finds a best match biometric profile, where a confidence level is associated with the best match. Step 824 displays a real-time image of the user being identified, assuming there is intent to engage. See, e.g., FIG. 11K for an example.

Thus, in one implementation, the system does not automatically display a real time image of the user being identified until the user shows an intent to engage. This is to prevent the perception that the device is "watching" the user and prevents noisy notifications in scenarios in which many users are presents (e.g., party scenarios).

Decision step 826 determines if the confidence level exceeds a threshold. As an example, a threshold of 60% may be used, depending on the matching process. If decision step 826 is true, the user has been identified with a high amount of certainty. Step 838 displays a thumbnail image of the user from an account associated with the matched biometric profile. See, e.g., FIG. 11L for an example. Step 832 optionally prompts the user to identify himself or herself, e.g., by selecting yes or no from the user interface of FIG. 11L. If the system has positively identified a user with a high level of confidence, the system may not prompt the user to identify himself. The recognition threshold can be set to a high level such that the system can be very confident that the user's identity is known.

At step 834, if applicable, the user identifies himself or herself. Step 836 signs the user into their account (if they are not signed in already) and updates the associated biometric profile with the biometric data used to identify them and, optionally other data that has been obtained and stored.

If decision step 826 is false, step 828 finds a second or further best match biometric profiles. Thus, a number n≥1 of matches can be obtained and ranked according to their confidence levels, from highest to lowest confidence level. Step 830 displays thumbnail images of users from accounts associated with the matched biometric profiles. See FIG. 11M for an example. Step 832, 834 and 836 are then followed. In step 834, the user can identify himself or herself, e.g., by performing a gesture such as raising a hand, waving or stepping forward or a voice command such as "yes."

Optionally, the user may not be prompted to identify himself or herself if the degree of confidence is very high. As an example, if the degree of confidence is 80-100%, the user is not prompted to identify himself or herself and is automatically signed in. Thus, the process includes obtaining other biometric data of a user before the user is signed into an account and while the user is in the field of view of a sensor, comparing the other biometric data to a biometric profile, and upon determining a match between the other biometric data and the biometric profile, automatically performing the signing in of the user to an account.

If the degree of confidence is 60-80%, the user is prompted to identify himself or herself using one thumbnail image and a yes or no response. If the degree of confidence is 40-60%, the user is prompted to identify himself or herself from among multiple users using multiple thumbnail images. If the degree of confidence is less than 40%, it is too low to make a reliable identification.

Figure 9:
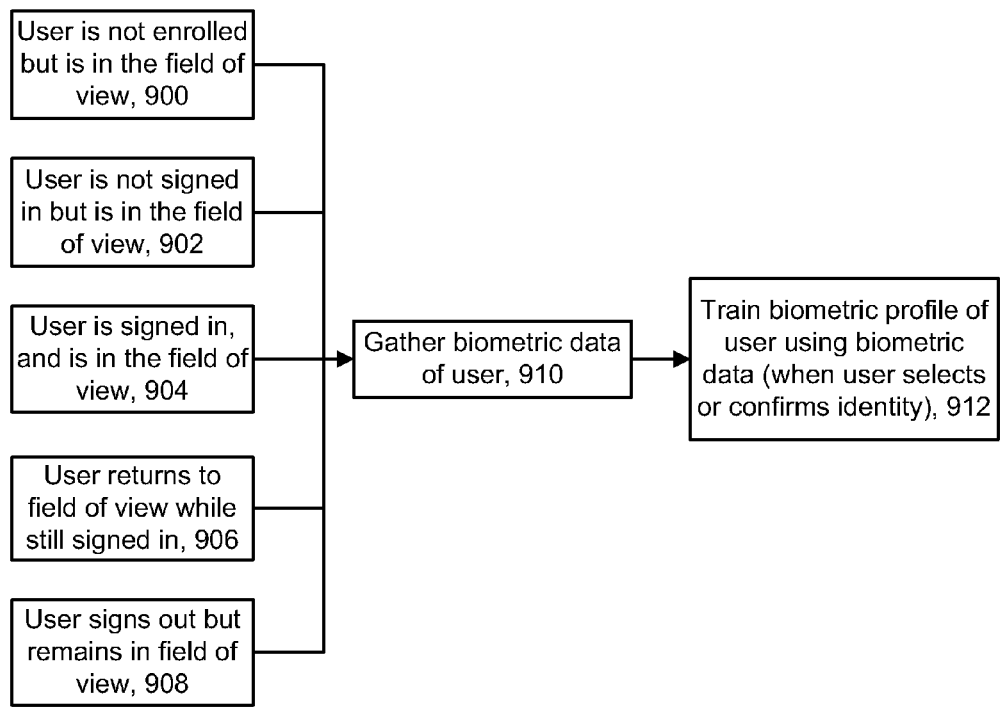
FIG. 9 depicts an example process for training a biometric profile of a user in accordance with step 506 of FIG. 5A.

FIG. 9 depicts an example process for training a biometric profile of a user in accordance with step 506 of FIG. 5A. A biometric profile can be substantially continuously updated before, during and after a user is signed into a session on a computing system. For example, at step 900, the user is not enrolled but is in the field of view. At step 902, the user is not signed in but is in the field of view. At step 904, the user is signed and is in the field of view. At step 906, the user returns to the field of view while still signed in. At step 908, the user signs out but remains in the field of view. In each of these situations, it is possible to continue to gather biometric data of the user at block 910 and to train the biometric profile of the user using the biometric data at block 912 when the user selects or confirms his identity.

Thus, biometric data can be gathered at times other than when the user's identity is requested by an application on the computing device. The biometric data can be gathered ahead of time, before the user's identity is requested, so that the identity is immediately available. The biometric data can be gathered while the user is interacting with the computing system, during a session, before or after a session and/or when the computing system is offline. Storage resources can be allocated to store the biometric data for subsequent training. Likewise, the data gathering can be temporarily suspended when processing resources are not available.

The training of the biometric profile can occur when the user selects or confirms his identity. Because a positive recognition has a chance of being incorrect, a conservative approach is to not automatically begin training a user's biometric profile until the user himself selects his true identity.

The biometric samples can be generated at various rates, such as multiple times per second, or once per few seconds or minutes. In one approach, the biometric samples are generated substantially continuously. Filtering processes such as described in connection with FIG. 6C can be used to reduce the amount of data which is processed. Moreover, the frequency with which the biometric data is gathered can be a function of the confidence level of previous biometric data as well as based on other factors, as mentioned, such as the amount of biometric data which has already been gathered for certain categories (see FIG. 5D). For example, the biometric data can be gathered less frequently when the confidence level of previous biometric data is relatively high, or more frequently when the confidence level of previous biometric data is relatively low. It is also possible to adjust the minimum confidence level of a satisfactory match based on results of the training process. For example, as a profile become more trained and therefore more accurate and robust, the minimum confidence level can be increased.

FIG. 10A depicts an example process for correcting an incorrect biometric recognition of a user in accordance with step 506 of FIG. 5A. In some cases, an incorrect biometric match is made with a confidence level which is above the minimum confidence level of a satisfactory match, such as when two users have a similar appearance or when a biometric profile is not well trained. In this case, the correct user (or another user such as the incorrect user) can enter a command via an appropriate user interface to correct the misidentification. At step 1000, using such a user interface, the controller (e.g., the controller device or the correct user's body) chooses the correct user. Step 1002 pairs the controller to the user. Optional decision step 1004 determines if the user chose to augment his or her biometric profile. The user interface shown when a user is signed in could allow the user to select to augment his biometric profile. Instead, the system may choose to automatically augment the selected user's biometric profile rather than asking the user if they would like the augmentation to occur. If decision step 1004 is false, the process is done at step 1014. If decision step 1004 is true, and the controller is a body at step 1006, the process is done at step 1014. If the controller is not a body at step 1006, e.g., the controller is a controller device, and the controller is paired to a body at decision step 1008, the process is done at step 1014. If decision step 1008 is false, step 1010 optionally prompts the user to enter the field of view and identify himself or herself, e.g., by raising a hand, waving, stepping forward and so forth. Step 1012 augments the user's biometric profile with the body's biometric samples and the process is done at step 1014. Alternatively, to reduce the burden on the user and make the sign-in process more user-friendly, the system may choose not to augment the user's biometric profile if the user's body is not being tracked, so that steps 1010 and 1012 are omitted.

FIG. 10B depicts another example process for correcting an incorrect biometric recognition of a user in accordance with step 506 of FIG. 5A. At step 1020, the correct user enters a command to correct the misidentification. At step 1022, the user interface displays thumbnail images of all users who have an account. Step 1024 prompts the user to identify himself or herself from among all users who have an account. At step 1026, the correct user identifies himself or herself by entering a command. Step 1028 signs out the incorrect user. Step 1030 signs the correct user into an account and updates the associated biometric profile.

Figure 11A:
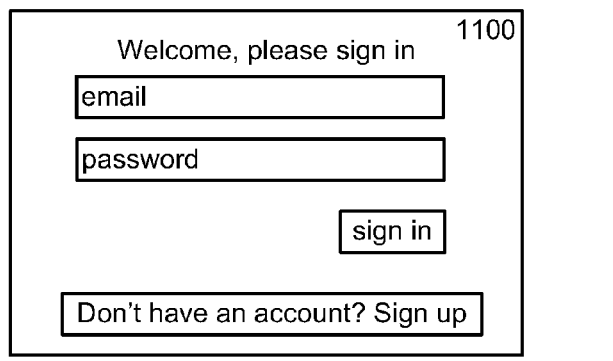
FIGS. 11A to 11N depict example user interfaces in accordance with FIGS. 7A to 10B.
Figure 11B:
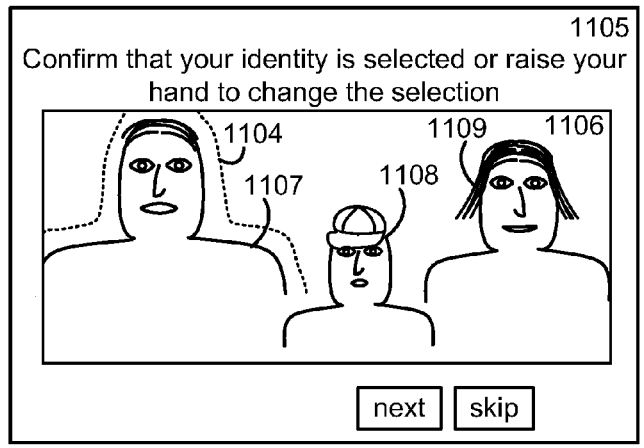
Figure 11C:
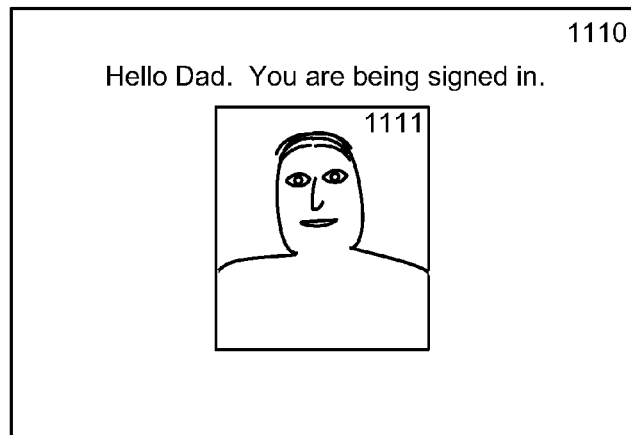
Figure 11D:
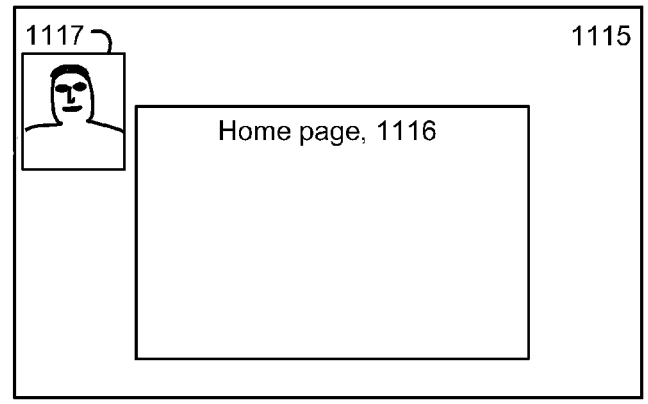
Figure 11E:
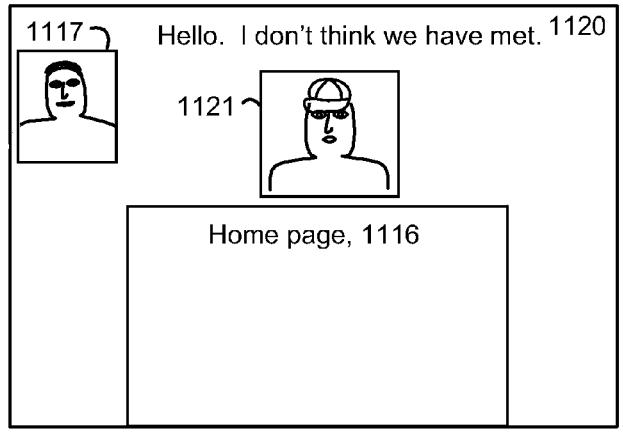
Figure 11F:
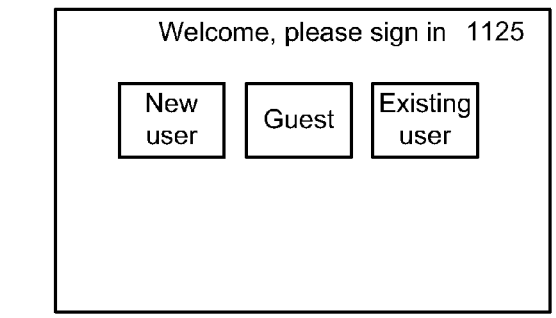
Figure 11G:
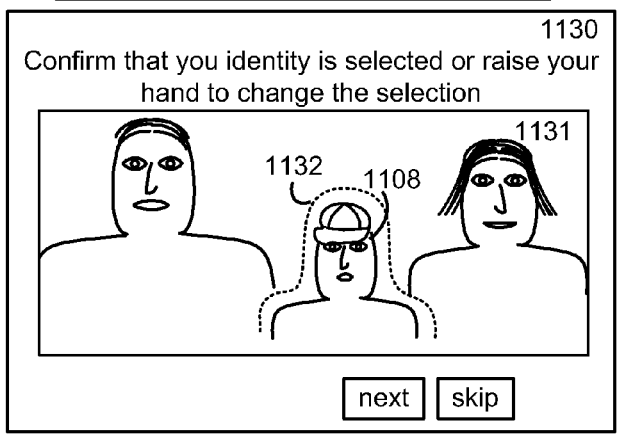
Figure 11H:
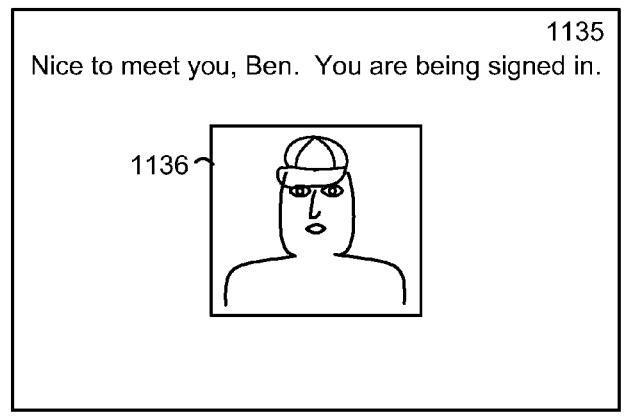
Figure 11I:
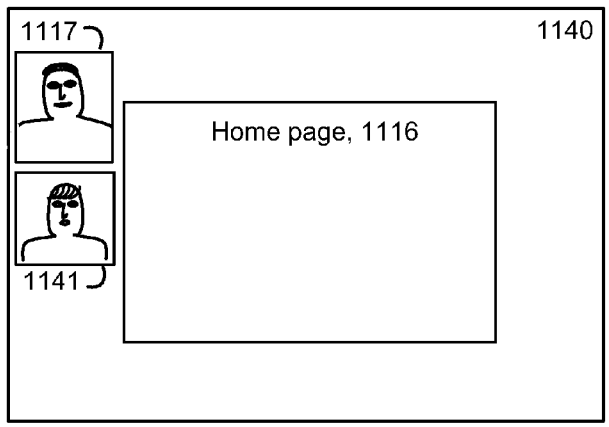
Figure 11J:
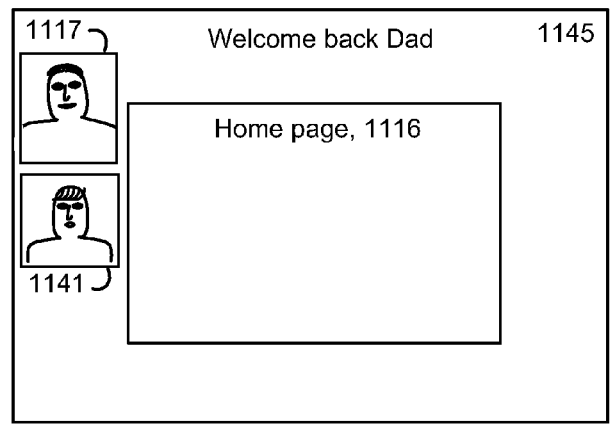
Figure 11K:
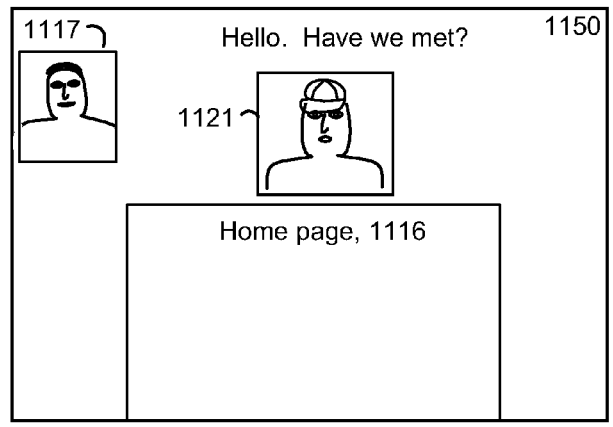
Figure 11L:
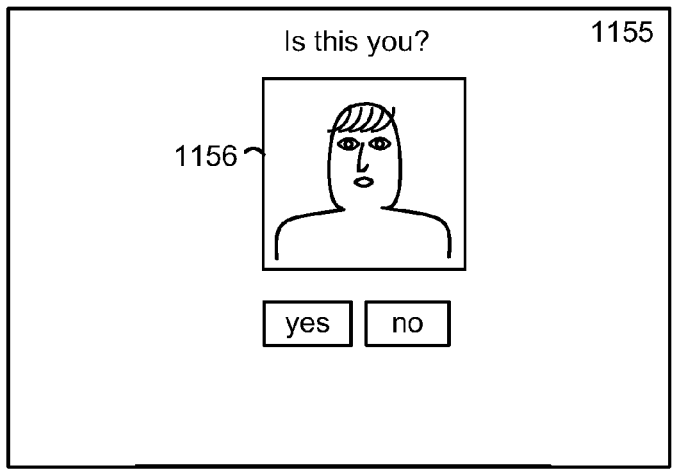
Figure 11M:
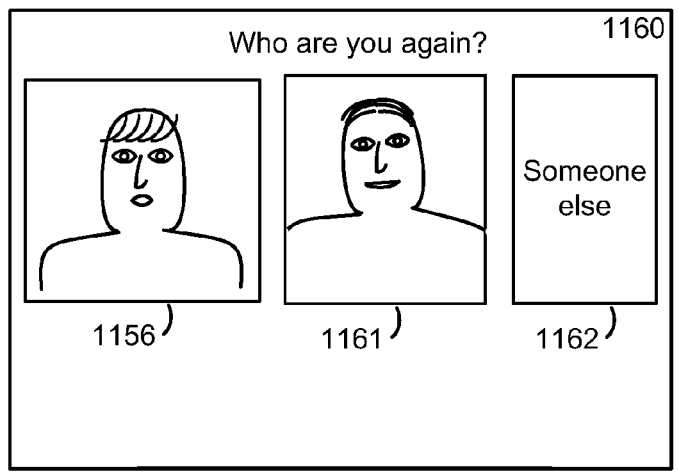
Figure 11N:
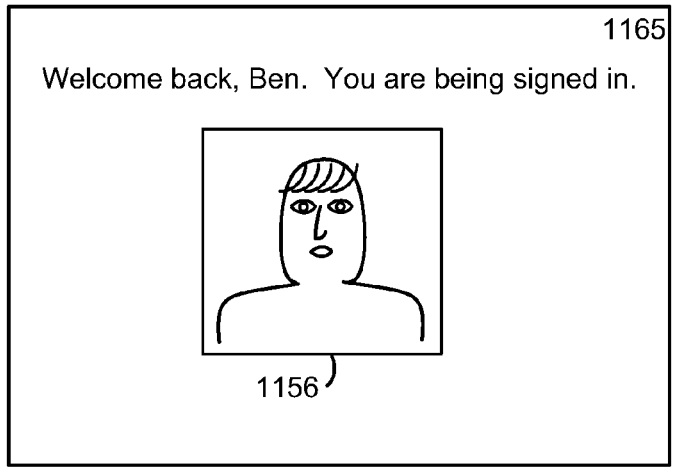

FIGS. 11A to 11N depict example user interfaces in accordance with FIGS. 7A to 10B. A goal of these scenarios is to demonstrate principles used to design the biometric identity system, including biometric enrollment integrated into sign-in, and providing feedback and correction mechanisms at the system level to handle unidentified or misidentified users.

FIG. 11A depicts a user interface 1100 in which a user can sign in to an existing account or sign up (enroll) with the computing system. For example, the user can provide an email address and a password which will be associated with the account.

FIG. 11B depicts a user interface 1105 in which a user is prompted to confirm his or her identity. The user interface includes a real-time image 1106 of multiple users in a field of view of a sensor. The users are Dad 1107, Ben 1108 and Mom 1109. Further, Dad is visually distinguished by a highlighted region 1104 to show that the computing system has identified him. This lets Dad know that the computing system has detected his body. An image of a user can be visually distinguished in different ways. Another example is to show the distinguished user's body in color while the other users are greyed out. The visual highlight can be provided by modifying the visible light camera image of the field of view based on knowledge of the detected body in the field of view. For example, an outline of each body can be determined, e.g., based on the users' skeletal models, subtraction of foreground objects from background objects or other technique. The outline of each body can be determined using the images from the infrared sensor and then superimposed on the visible light camera image. Or, the outline of each body can be determined using the images from the visible light camera. In another approach, a user's body is highlighted in a real-time image from the infrared camera.

The user interface includes a message: Confirm that your identity is selected or raise your hand to change the selection. The user (Dad) can select the "next" button if the identification is correct or the "skip" button if the used does not wish to be biometrically enrolled.

FIG. 11C depicts a user interface 1110 in which Dad is signed in. The user interface includes a message: Hello Dad. You are being signed in. Additionally, a thumbnail image 1111 of Dad is displayed. The thumbnail image can be a previously obtained image in which the user has a slightly different appearance than at the time of sign in. For example, the user in the thumbnail image has a different facial expression and head orientation.

FIG. 11D depicts a user interface 1115 in which Dad is signed in and a home page 1116 is displayed. A thumbnail image 1117 of Dad is displayed to the side of the home page as a notification that Dad is signed in.

FIG. 11E depicts a user interface 1120 in which Ben begins interacting with the computing system such as by shouting or raising his arm (not shown). In this example, Ben has not been enrolled and therefore is not recognized. The user interface displays a real-time image 1121 of Ben and a message: Hello. I don't think we have met. This lets Ben know that the computing system has detected his body. In this case, the computing system is fairly certain that the biometric data of Ben does not match any of the current biometric profiles.

FIG. 11F depicts a user interface 1125 which allows Ben to sign in as a new user, a guest or an existing user. The user interface also displays a message: Welcome, please sign in.

FIG. 11G depicts a user interface 1130 in which Ben is prompted to confirm his identity. In the real-time image 1131 of the multiple users in a field of view of a sensor, Ben is visually distinguished by a highlighted region 1132 to show that the computing system has identified him. The user interface includes a message: Confirm that your identity is selected or raise your hand to change the selection. The user can select the "next" button if the identification is correct or the "skip" button if the used does not wish to be biometrically enrolled.

FIG. 11H depicts a user interface 1135 in which Ben is signed in as a new user. The user interface includes a message: Nice to meet you, Ben. You are being signed in. Additionally, a thumbnail image 1136 is captured and displayed.

FIG. 11I depicts a user interface 1140 in which a thumbnail image 1141 of Ben is displayed next to the thumbnail image 1117 of Dad to indicate that they are both currently signed in.

FIG. 11J depicts a user interface 1145 in which a notification is displayed when Dad has left the field of view and then is recognized again when re-entering the field of view. For example, Dad may leave the room and then return a few minutes later. A user can be kept signed in for a period of time in which their body is not detected in the field of view. The message is: Welcome back Dad. In this example, Ben is still signed in.

FIG. 11K to FIG. 11N depict a case, such as discussed in connection with FIG. 8B, in which the computing system believes the biometric data of Ben matches one biometric profile with a degree of confidence above a threshold. For example, FIG. 11K depicts a user interface 1150 in which a real-time image 1121 of Ben is displayed with a message: Hello. Have we met?

FIG. 11L depicts a user interface 1155 in which a thumbnail image 1156 of Ben is displayed with a message: Is this you? The user can select the "yes" button to confirm that it is him, or the "no" button if it is not him. In this example, the thumbnail image of Ben is an image where Ben does not have his cap on. See also step 832 of FIG. 8B. This is an example of informing the user that he or she is believed to be associated with a user account and prompting the user to confirm his or her identity.

FIG. 11M depicts a user interface 1160 in which a thumbnail image 1156 of Ben and a thumbnail image 1161 of Dad are displayed with a message: Who are you again? This is an example of informing the user that he or she is believed to be associated with a user account (Ben) of a first best match and a user account (Dad) as a second best match, prompting the user to confirm his or her identity be selecting from among these choices. A menu selection 1162 called "Someone else" allows the user to call up a list of all user accounts to identify himself. See also step 830 of FIG. 8B.

Since Ben is the current user, he selects the thumbnail image 1156, resulting in the user interface 1165 of FIG. 11N which includes the message: Welcome back, Ben. You are being signed in.

FIGS. 12A to 12H depict example states of a biometric recognition system in accordance with the user interfaces of FIGS. 11A to 11N. The state is indicated by a table. The first column indicates one or more actual users who are in the field of view and is not part of the data of state data. The second column indicates whether the controller of the user is a body or a gamepad (an example of a controller device). The third column indicates an identity of the user according to the biometric recognition system, which is the same as the identity of the actual user unless there is a misidentification. If the user is in the process of being identified, the notation "Identifying" appears. Column biometric recognition system FIG. 12A provides an example state for the user interface of FIG. 11B. There are three identified bodies in the field of view: body 1 (Dad), body 2 (Ben) and body 3 (Mom). Additionally, assume Dad is holding a controller device (gamepad A) and this has also been detected and associated with body 1. The computing system is in the process of identifying each user. FIG. 12B provides an example state in which Dad has been identified, corresponding to the user interfaces of FIGS. 11C and 11D. The state of FIG. 12B also applies to the user interfaces of FIG. 11E since Ben has not been identified. Once Ben confirms his identity in the user interfaces of FIGS. 11F and 11G, the state of FIG. 12C is reached in the user interface of FIG. 11H.

The state of FIG. 12D applies when Dad is signed in but leaves the field of view. The state indicates that Dad and his body, body 1, are not present. When Dad re-enters the field of view, the state of FIG. 12E indicates that his body, body 1, is being identified, in the second row of the table. In this example, Dad does not have the gamepad with him at this time. A separate entry remains for the signed in Dad in the first row of the table. The state of FIG. 12F applies when Dad is identified. Dad's body, but not the gamepad, is the controller. The user interface of FIG. 11J corresponds to this state.

The state of FIG. 12G applies to the user interface of FIG. 11K. Assume that Mom is no longer present. Dad has been identified and Ben is in the process of being identified. Once Ben confirms his identity, the state of FIG. 12H is reached, corresponding to the user interface of FIG. 11N.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A computer-implemented method for recognizing a user, comprising:
   obtaining biometric data of a first user from a sensor while the first user is in a field of view of the sensor;
   determining a biometric profile which is a best match to the biometric data of the first user, the biometric profile is linked to a first user account;
   determining a confidence level of the best match;
   determining whether the confidence level is in a first, second or third range;
   if the confidence level is in the first range, signing the first user into the first user account without prompting the first user to confirm his or her identity;
   if the confidence level is in the second range, which is below the first range, displaying an image of a user associated with the first user account on a user interface while prompting the first user to confirm his or her identity; and
   if the confidence level is in the third range, which is below the second range, determining a biometric profile which is a second best match to the biometric data of the first user, the biometric profile which is the second best match is linked to a second user account, and displaying the image of the user associated with the first user account and an image of a user associated with the second user account on the user interface while prompting the first user to confirm his or her identity.

2. The computer-implemented method of claim 1, wherein:
   if the confidence level is in the second range, displaying a real-time image of the first user from the sensor with the image of the user associated with the first user account on the user interface.

3. The computer-implemented method of claim 1, where the method performed further comprises:
   in response to the first user confirming his or her identity, signing the first user into the first user account.

4. A computer-readable storage device having computer-readable software embodied thereon for programming a processor to perform a method for recognizing a user, the method comprising:
   signing a first user into an account in a computing system, the account associates the first user with a biometric profile of the first user, the biometric profile comprises biometric data of the first user obtained from a sensor;
   obtaining additional biometric data of the first user from the sensor while the first user is signed into the account and while the first user is in a field of view of the sensor;
   updating the biometric profile based on the additional biometric data;
   performing a filtering process which provides the additional biometric data within a defined range of head orientations of the first user in which the first user is facing the sensor, the biometric data of the biometric profile is also within the defined range of head orientations.

5. The computer-readable storage device of claim 4, wherein:
the biometric data of the biometric profile is classified into different categories based on biometric data-gathering conditions; and
a rate of the obtaining the additional biometric data is based on a current biometric data-gathering condition and an amount of biometric data which has been gathered with the current biometric data-gathering condition, the rate is relatively higher when the amount of biometric data which has been gathered with the current biometric data-gathering condition is relatively lower.

6. The computer-readable storage device of claim 5, wherein:
the different categories include categories for different lighting conditions.

7. The computer-readable storage device of claim 4, wherein:
the different categories include categories for distance of the first user from the sensor.

8. The computer-readable storage device of claim 4, wherein:
the biometric profile is managed by a shell on the computing system; and
the shell makes the biometric profile available to any of a plurality of applications on the computing system so that the plurality of applications can identify the first user using the biometric profile.

9. The computer-readable storage device of claim 4, wherein:
the sensor comprises an active infrared sensor; and
the additional biometric data comprises facial recognition data.

10. The computer-readable storage device of claim 4, wherein:
the updating comprises performing a machine learning process in which the biometric profile is trained using the additional biometric data.

11. The computer-readable storage device of claim 4, wherein the method performed further comprises:
performing a filtering process which provides the additional biometric data within a plurality of defined ranges of head orientations of the first user in which the first user is facing the sensor, the biometric data of the biometric profile is also within the plurality of defined range of head orientations, and the biometric data of the biometric profile is updated separately for each defined range of head orientations.

12. The computer-readable storage device of claim 4, wherein the method performed further comprises:
obtaining other biometric data of the first user before the first user is signed into the account and while the first user is in the field of view of the sensor; and
updating the biometric profile based on the additional biometric data when the first user confirms his identity to the computing system and indicates an intent to interact with the computing system.

13. A computing system, comprising:
a storage device comprising processor readable code; and
a processor in communication with the storage device, the processor executes the processor readable code to: obtain biometric data of a first user from a sensor while the first user is in a field of view of the sensor, store the biometric data in a cache to provide cached biometric data which represents several minutes worth of biometric data, make a detection of an intent by the first user to interact with the computing system, in response to the detection of the intent by the first user to interact with the computing system, initiate a process to allow the user to sign into an account, the account associates the first user with a biometric profile of the first user, the biometric profile is obtained using the cached biometric data, and the biometric data is obtained before the detection of the intent by the first user to interact with the computing system.

14. The computing system of claim 13, wherein:
the processor makes the detection of the intent by the first user to interact with the computing system based on a movement of the first user in the field of view.

15. The computing system of claim 13, wherein:
the processor makes the detection of the intent by the first user to interact with the computing system based on a voice command which is correlated to a position of the first user in the field of view.

16. The computing system of claim 13, wherein:
the processor obtains additional biometric data of the first user from the sensor while the first user is signed into the account and while the first user is in the field of view of the sensor, and updates the biometric profile based on the additional biometric data.

17. The computing system of claim 13, wherein:
the processor obtains biometric data of a second user who is with the first user in the field of view of the sensor and, in response, provides a prompt to the first user to distinguish himself or herself from the second user, and the processor, to provide the prompt, displays a real-time image of the first user and the second user from the sensor in which the first user is visually distinguished from the second user.

18. The computer-implemented method of claim 1, wherein:
if the confidence level is in the second range, the user confirms his or her identity by selecting a yes or a no response from the user interface.

19. The computer-implemented method of claim 1, wherein:
if the confidence level is in the third range, the user confirms his or her identity by selecting the image of the user associated with the first user account or the image of the user associated with the first user account from the user interface.

20. The computing system of claim 13, wherein:
the processor makes the detection of the intent by the first user to interact with the computing system based on a location of a controller device which is correlated to a position of the first user in the field of view, and the location of the controller device is tracked by an infrared camera.

* * * * *